(12) United States Patent
Makino

(10) Patent No.: US 7,746,772 B2
(45) Date of Patent: Jun. 29, 2010

(54) INFORMATION PROCESSING APPARATUS AND METHOD

(75) Inventor: Jun Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 634 days.

(21) Appl. No.: 11/555,963

(22) Filed: Nov. 2, 2006

(65) Prior Publication Data

US 2007/0106987 A1    May 10, 2007

(30) Foreign Application Priority Data

Nov. 10, 2005  (JP) .............................. 2005-326593

(51) Int. Cl.
*G01R 31/08* (2006.01)
*G08C 15/00* (2006.01)
*G06F 9/46* (2006.01)

(52) U.S. Cl. ..................... 370/229; 370/252; 718/106

(58) Field of Classification Search ................. 370/229, 370/252
See application file for complete search history.

(56) References Cited

U.S. PATENT DOCUMENTS 5,465,354 A * 11/1995 Hirosawa et al. ............ 718/106
7,322,033 B2 * 1/2008 Ito ............................ 718/104
7,362,465 B2 * 4/2008 Nishikawa et al. .......... 358/1.16
2004/0194011 A1 * 9/2004 Matsumura ................. 715/500
2005/0027825 A1   2/2005 Hikawa et al. .............. 709/219
2005/0275884 A1 * 12/2005 Matsukubo et al. ......... 358/1.15

FOREIGN PATENT DOCUMENTS

JP   10-083263    3/1998
JP   2004-287861  10/2004

* cited by examiner

*Primary Examiner*—Derrick W Ferris
*Assistant Examiner*—Angel Brockman
(74) *Attorney, Agent, or Firm*—Fitzpatrick, Cella, Harper & Scinto

(57) ABSTRACT

A task cooperation processing method acquires a processing flow in which cooperation processing by a plurality of tasks is defined. Input information associated with the amount of data to be processed by the acquired processing flow is set. The task cooperation processing method calculates an estimation time required for the processing of the acquired processing flow on the basis of the input information. If the calculated estimation time is longer than a designated time limit, the function settings of each task in the processing flow are changed to make the calculated estimation time become equal to or shorter than the time limit.

13 Claims, 25 Drawing Sheets

FIG. 4

```
<JobFlow1>
    <task1>
        <before>start</before>
        <after>task2</after>
        <after>task3</after>
        <property>
            TO BE WRITTEN WHEN THERE IS ATTRIBUTE INFORMATION
        </property>
    </task1>
    <task2>
        <before>task1</before>
        <after>task4</after>
    </task2>
    <task3>
        <before>task1</before>
        <after>task4</after>
    </task3>
    <task4>
        <before>task2</before>
        <before>task3</before>
        <after>end</after>
    </task4>
</JobFlow1>
```

| SET VALUE | ATTRIBUTE NAME | DETAILS | VALUE |
|---|---|---|---|
| | FUNCTION NAME | | SCAN |
| | READ SIZE | | AUTOMATIC DETECTION |
| | ORIGINAL SET ORIENTATION INSTRUCTION | | LEFT |
| | DOUBLE-SIDED ORIGINAL FEED | | DOUBLE-SIDED |
| | IMAGE QUALITY OF ORIGINAL | | CHARACTER |
| | COLOR MODE | | COLOR (16 GRAY LEVELS) |
| | UNDERCOLOR REMOVAL | | NO |
| | DENSITY | | ORDINARY |
| | READ RESOLUTION | | 600dpi |
| | READ MAGNIFICATION | | 100% |
| | NEXT ORIGINAL | | NO NEXT ORIGINAL |
| | ... | | ... |

FROM FIG. 5C

518

| SET VALUE | ATTRIBUTE NAME | DETAILS | VALUE |
|---|---|---|---|
| | FUNCTION NAME | | SCAN |
| | READ SIZE | | AUTOMATIC DETECTION |
| | ORIGINAL SET ORIENTATION INSTRUCTION | | LEFT |
| | DOUBLE-SIDED ORIGINAL FEED | | SINGLE-SIDED |
| | IMAGE QUALITY OF ORIGINAL | | CHARACTER |
| | COLOR MODE | | MONOCHROME (TWO GRAY LEVELS) |
| | UNDERCOLOR REMOVAL | | NO |
| | DENSITY | | ORDINARY |
| | READ RESOLUTION | | 200dpi |
| | READ MAGNIFICATION | | 100% |
| | NEXT ORIGINAL | | NO NEXT ORIGINAL |
| | ... | | ... |

TO FIG. 5E

FROM FIG. 5C

DOUBLE-SIDED → SINGLE-SIDED

COLOR (16 GRAY LEVELS) → MONOCHROME (TWO GRAY LEVELS)

600dpi → 200dpi

| CHANGE SEQUENCE LIST |
|---|
| (1) RESOLUTION<br><br>(2) PRINT METHOD<br><br>(3) COLOR MODE<br><br>⋮ |

F I G. 10B (1) 600dpi → 200dpi (2) DOUBLE-SIDED → SINGLE-SIDED (3) COLOR (16 GRAY LEVELS) → MONOCHROME (TWO GRAY LEVELS)

⋮

F I G. 11A
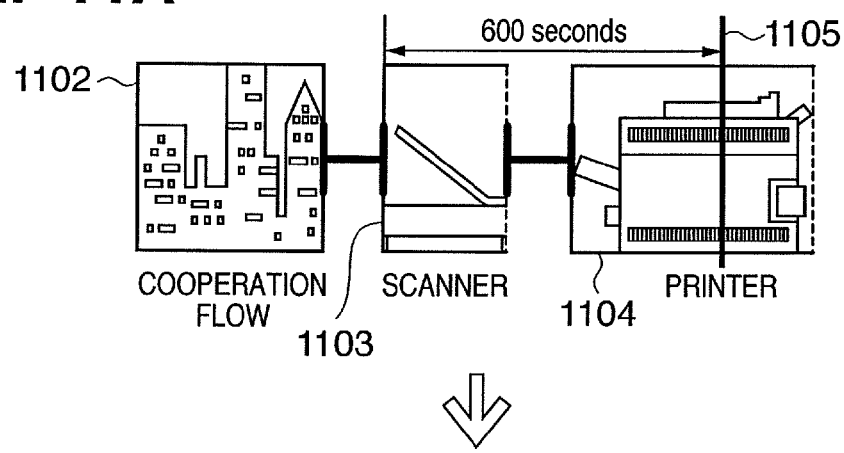
F I G. 11B
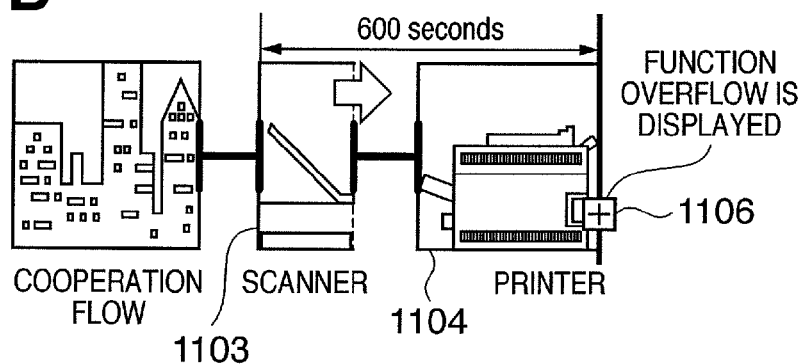

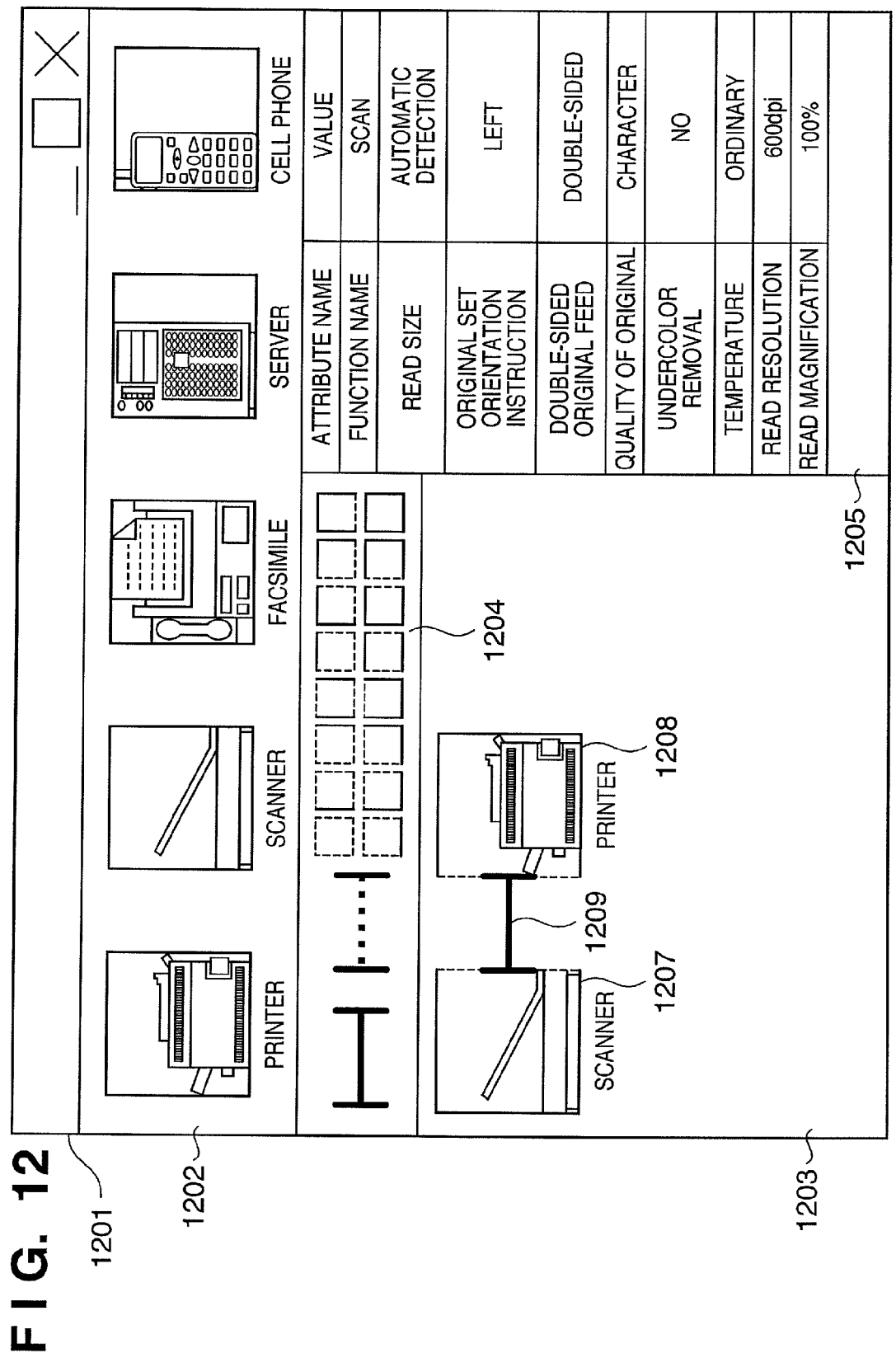

INFORMATION PROCESSING APPARATUS AND METHOD

BACKGROUND OF THE INVENTION

1. Field of the Invention

The present invention relates to a method and apparatus for creating a cooperation processing flow which defines cooperation processing for a plurality of tasks and executing the flow.

2. Description of the Related Art

Conventionally, a multi-function peripheral combining a copying machine with facsimile, scanner, and printer functions is known. Such a multi-function peripheral allows cooperation between paperwork processing mainly based on sheets of paper which uses the copying machine, the facsimile apparatus, and the like and processing of digitized documents on a personal computer. More specifically, this apparatus can scan a paper document and transfer the resultant data to the personal computer or can transmit a document received by the facsimile function as image data to the personal computer without printing it.

In addition, the automation of more procedures and processes is required in cooperation with each other after paper documents and facsimile received documents are digitized. For this purpose, there has been proposed a technique for preparing cooperation templates describing desired settings for items to be set in advance in a multi-function peripheral, designating a cooperation template, and performing processing upon changing set values as needed. For example, Japanese Patent Laid-Open No. 10-83263 discloses an image forming apparatus that can store a plurality of output setting data (cooperation templates) for setting output forms and can form and output images in output forms in accordance with selected output setting data. In the above image forming apparatus, as proposed in Japanese Patent Laid-Open No. 2004-287861, there is a technique for making settings not only for the functions of the apparatus itself but also for other printers, scanners, and other similar devices connecting to a network and for cooperation of processes, thereby allowing cooperation of a plurality of processes.

However, the image forming apparatuses disclosed in Japanese Patent Laid-Open Nos. 10-83263 and 2004-287861 cannot set a cooperation flow in consideration of the processing times in other printers, scanners, and the like connecting to a network and the processing time in the image forming apparatus itself. For this reason, if some limitation is imposed on the time during which processing is to be performed, the above apparatuses cannot terminate a cooperation flow within the time limit.

SUMMARY OF THE INVENTION

The present invention has been made in consideration of the above problems, and has as its object to allow each device connecting to a network to process a cooperation flow within a desired time limit.

According to one aspect of the present invention, there is provided a task cooperation processing method comprising: an acquisition step of acquiring a processing flow which defines cooperation processing performed by a plurality of tasks; a setting step of setting input information associated with an amount of data to be processed by the acquired cooperation flow; a calculation step of calculating an estimation time required for processing of the acquired processing flow on the basis of the input information; and a change step of, when the estimation time is longer than a designated time limit, changing function settings of tasks in the processing flow so as to make the estimation time calculated in the calculation step become not more than the time limit.

According to another aspect of the present invention, there is provided an information processing apparatus which processes a processing flow in which cooperation processing by a plurality of tasks is defined, comprising: an acquisition unit adapted to acquire a processing flow which defines cooperation processing performed by a plurality of tasks; a setting unit adapted to set input information associated with an amount of data to be processed by the acquired cooperation flow; a calculation unit adapted to calculate an estimation time required for processing of the acquired processing flow on the basis of the input information; and a change unit adapted to, when the estimation time is longer than a designated time limit, change function settings of tasks in the processing flow so as to make the estimation time calculated by the calculation unit become not more than the time limit.

Furthermore, according to another aspect of the present invention, there is provided a system in which a plurality of information processing apparatuses including a first information processing apparatus and a second information processing apparatus are communicatively connected to each other, wherein the first information processing apparatus comprises a holding unit adapted to hold a plurality of types of processing flows in which cooperation processing by a plurality of tasks is defined, and the second information processing apparatus comprises: an acquisition unit adapted to acquire a processing flow to be executed by the first information processing apparatus, a setting unit adapted to set input information associated with an amount of data to be processed by the acquired processing flow, a calculation unit adapted to calculate an estimation time required for processing of the acquired processing flow on the basis of the input information, and a change unit adapted to, when the estimation time is longer than a designated time limit, change function settings of a task in the processing flow such that the estimation time calculated by the calculation unit becomes not more than the time limit.

Further features of the present invention will become apparent from the following description of exemplary embodiments with reference to the attached drawings.

BRIEF DESCRIPTION OF THE DRAWINGS

FIG. 4 is a view showing an example of the description of cooperation flow definition information concerning the flow in FIG. 3 as an example according to the first embodiment;

FIGS. 5C to 5F are views showing a concept of a solving technique in the first embodiment;

FIG. 8 is a view showing an example of display for notifying changed contents;

FIGS. 10A and 10B are views for explaining a change sequence list and a change report;

FIGS. 11A and 11B are views showing a concept of a solving technique using an automatic adjustment function in the second embodiment;

FIG. 12 is a view showing an example of a GUI for the creation of a cooperation flow for which an automatic adjustment function can be set in the second embodiment;

DESCRIPTION OF THE EMBODIMENTS

Preferred embodiments of the present invention will now be described in detail in accordance with the accompanying drawings.

First Embodiment

System Configuration

The configuration of a system used in this embodiment and an application configuration will be described first.

Figure 1:
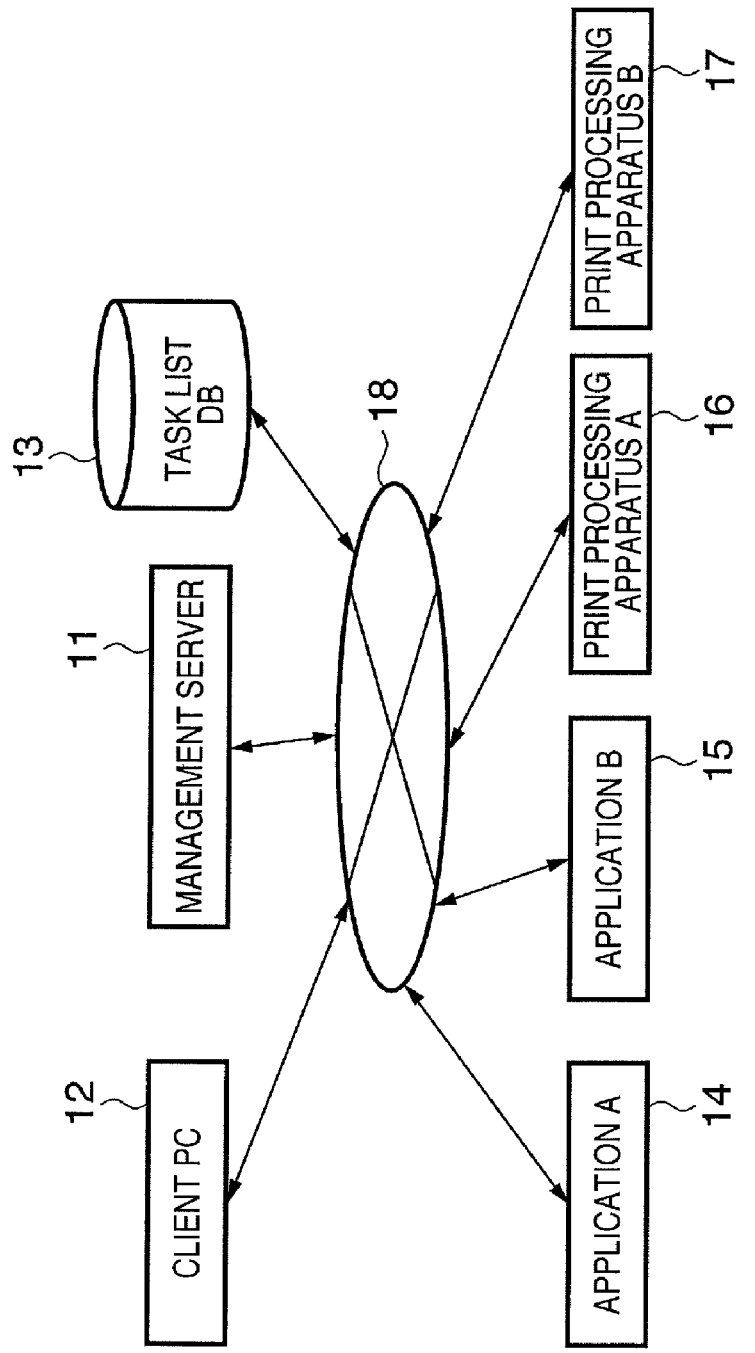
FIG. 1 is a view showing the system configuration of a service cooperation processing system according to the first embodiment.

FIG. 1 is a view showing the overall configuration of a task cooperation processing system according to the embodiment. The task cooperation processing system is a system which can execute various tasks including tasks from a given print processing apparatus to another print processing apparatus in cooperation with each other.

Assume that in this embodiment, a task represents processing which can be executed for document data. For example, a task assigned to a print processing apparatus is to execute, for example, copying, scanning, or Fax transmission of document data, storage of document data into the hard disk in the print processing apparatus, or mail sending of document data. However, the present invention is not specifically limited to this. In addition, this task cooperation processing system can realize cooperation between a plurality of applications which can provide various tasks as well as the print processing apparatus which provides the above tasks. In this specification, print processing apparatuses and applications which can execute the above tasks are defined as task processing apparatuses. Referring to FIG. 1, a print processing apparatus A 16, a print processing apparatus B 17, and an information processing apparatus which executes an application A 14 and an application B 15 are task processing apparatuses.

As shown in FIG. 1, the task cooperation processing system of this embodiment comprises a management server 11, a client PC 12, a task list database (DB) 13, the application A 14, the application B 15, the print processing apparatus A 16, and the print processing apparatus B 17. These apparatuses connect to each other through a network 18. Note that the numbers of applications and print processing apparatuses are not specifically limited. In addition, the task list DB 13 may be prepared for each application or prepared independently of task management by a print processing apparatus. The method of using the task list DB is not specifically limited. The following description will be made on the assumption that two applications (14, 15) and two print processing apparatuses (16, 17) connect to each other in this task cooperation processing system. Note, however, that the expression "applications connect" means that information processing apparatuses capable of executing the applications connect. The system shown in FIG. 1 may take a form in which an information processing apparatus capable of executing the applications A and B connects to the network 18 or a form in which separate information processing apparatuses capable of executing the applications A and B connect to the network 18.

The management server 11 manages the application A 14, application B 15, print processing apparatus A 16, and print processing apparatus B 17, and manages a list of tasks which can be executed by the respective task processing apparatuses by using the task list DB 13. The user uses the client PC 12 to acquire information about executable tasks from the task list DB 13 through the management server 11 and create a cooperation flow by combining desired tasks. Note that a cooperation flow is a unit of cooperation processing obtained by combining a plurality of tasks, and a plurality of tasks in the cooperation processing are continuously executed. The created cooperation flow is managed on the management server 11 and can be executed from the print processing apparatuses 16 and 17.

<Task Definition Information>

Figure 2:
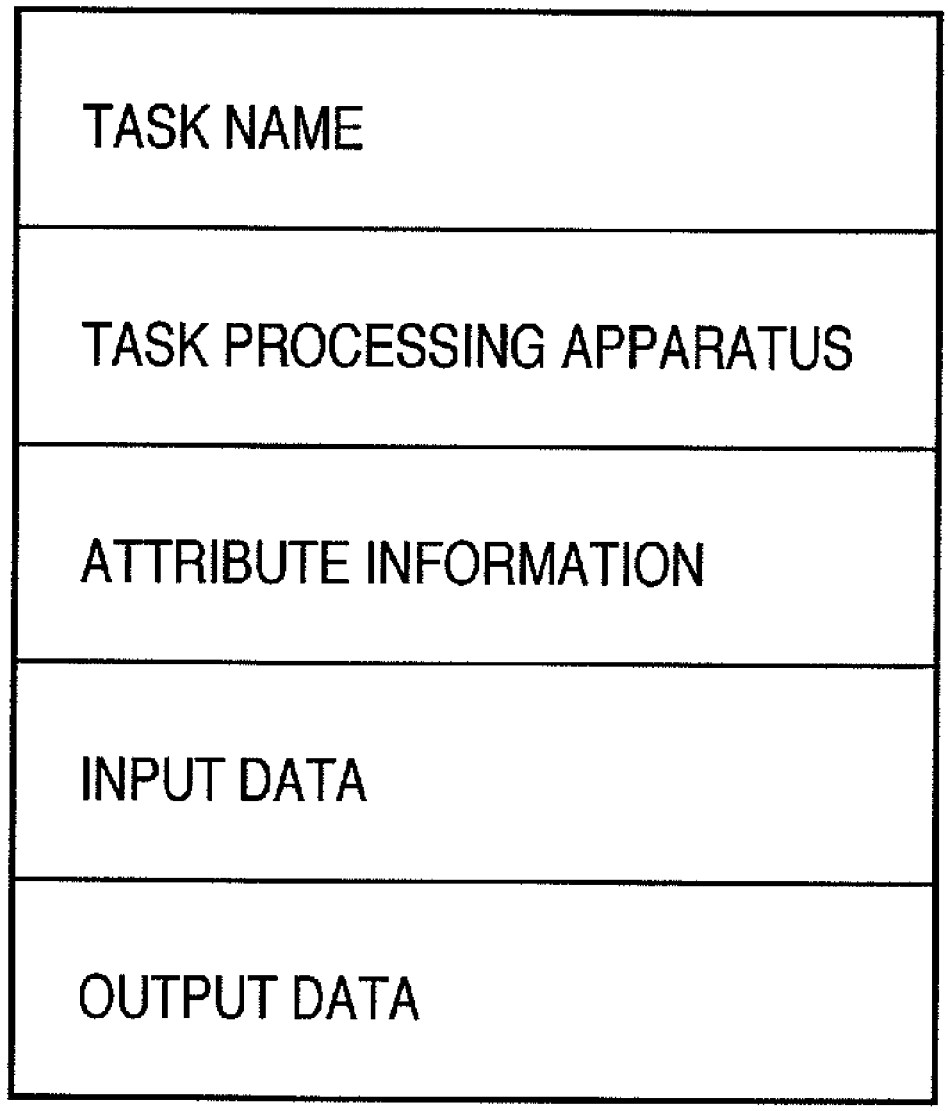
FIG. 2 is a view showing task definition information in the first embodiment.

FIG. 2 is a view showing task definition information for the registration of task information in the task list DB 13. Task definition information contains pieces of information each indicating a task name, a task processing apparatus capable of executing the task, attribute information necessary for the execution of the task, input data necessary for the execution of the task, and output data to be output after the execution of the task. Note that the description form or the like of task definition information is not specifically limited to this.

<Cooperation Flow Definition Information>

Figure 3:
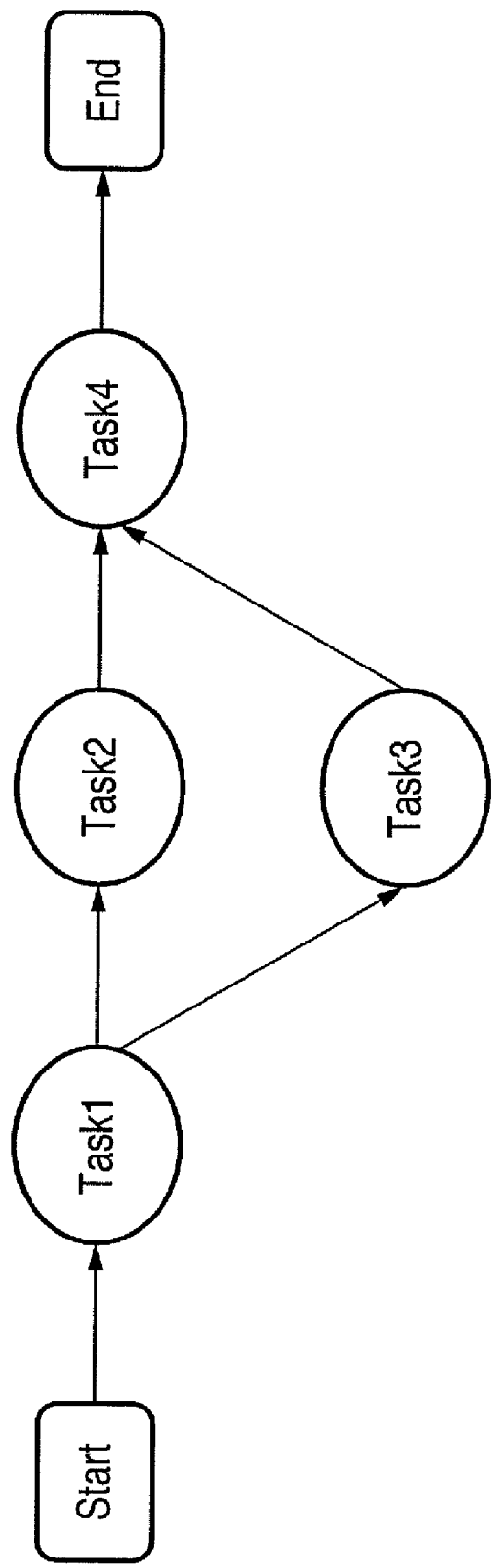
FIG. 3 is a view showing an example of a cooperation flow to explain cooperation flow definition information in the first embodiment.

FIGS. 3 and 4 are views for explaining cooperation flow definition information in this embodiment. FIG. 3 is a view showing an example of a cooperation flow to explain cooperation flow definition information in this embodiment. FIG. 3 shows an example of a cooperation flow in which after a task 1 is executed, tasks 2 and 3 are executed in parallel, and then a task 4 is executed, thereby terminating the processing.

FIG. 4 shows cooperation flow definition information defining the cooperation flow exemplified in FIG. 3 in the XML form. In this embodiment, in order to define a task execution sequence, <task> tags are prepared in XML to write the name of each task to be executed before a corresponding task and write the name of each task to be executed after the corresponding task. If information about an attribute of a task is defined in task definition information, the corresponding information is written in <property> tags. Cooperation flow definition information is completed by writing such definitions for all the tasks defined in a cooperation flow. Note that the writing form of cooperation flow definition information is not limited to the XML form as long as the sequence of tasks can be specified.

<Basic Concept>

Figure 5A:
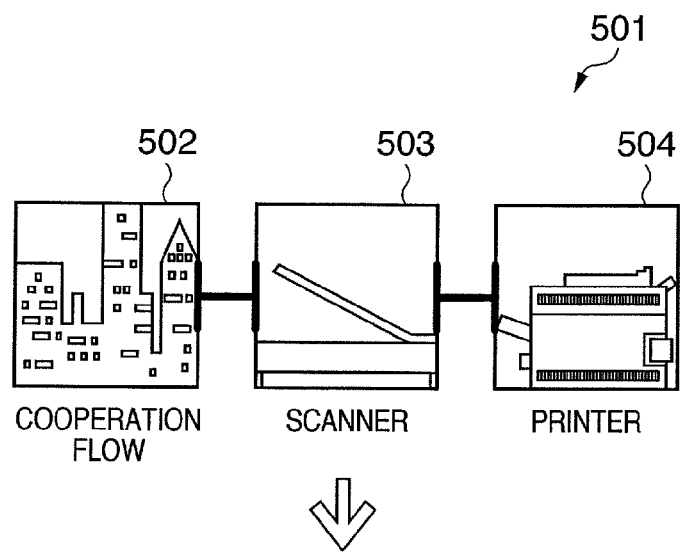
FIGS. 5A and 5B are views showing a concept of a solving technique in the first embodiment.
Figure 5B:
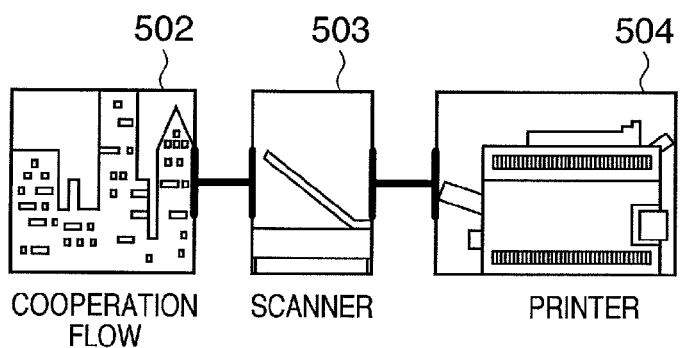

FIGS. 5A and 5B are views showing the basic concept of this embodiment.

First of all, when designating a desired cooperation flow of the cooperation flows managed by the management server 11, a cooperation flow execution device (e.g., the print processing apparatus A 16) downloads the designated cooperation flow from the management server 11. The display unit of the cooperation flow execution device displays the downloaded cooperation flow, as shown in FIG. 5A. Note that the client PC 12 creates a cooperation flow like that shown in FIG. 5A by using a user interface to be described with reference to FIGS. 6A and 6B.

Upon receiving information about data (jobs) to be processed in the cooperation flow, the flow execution device estimates the processing time required for the processing of the job in each task. As shown in FIG. 5B, the device then changes the width of each task icon in accordance with the magnitude of the estimated processing time. For example, a cooperation flow 501 includes tasks (cooperated tasks) indicated by task icons 503 and 504. Upon receiving information about jobs (data), the device acquires an estimated processing time required for the processing of the job in each of these cooperated tasks. The device then expresses the task icons 503 and 504 with sizes corresponding to the respective acquired processing times, thereby displaying the task icons 503 and 504 in FIG. 5B in accordance with the temporal magnitudes. Note that an icon 502 is like an index but does not indicate any task.

For example, in the cooperation flow shown in FIG. 5A, information about job data includes the size and number of originals to be processed, image contents, the number of copies, and the like. More specifically, the cooperation flow execution device receives information like "original size: A4, number of originals: 50, image contents: characters, number of copies: 10". The cooperation flow execution device estimates a processing time required for each task on the basis of this information. Note that the management server 11 manages the performance of each task in accordance with a task execution device, and the cooperation flow execution device can refer to the performance when estimating a processing time.

Figure 5C:
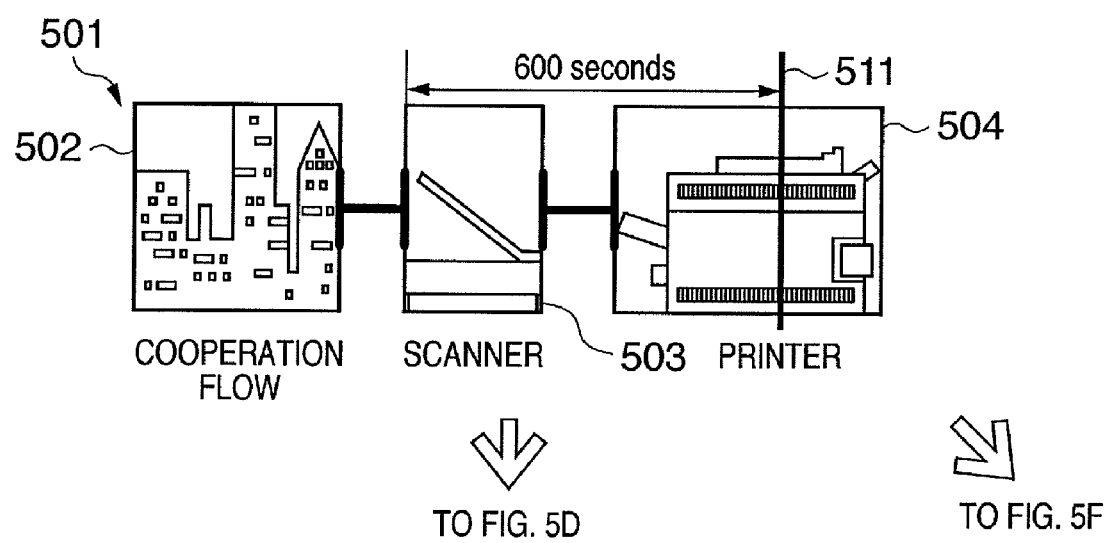

A temporal limitation is then imposed on a cooperation flow having a concept of a temporal magnitude. FIG. 5C shows an example in which a temporal limitation of 600 sec is imposed on the cooperation flow 501 having a temporal magnitude. In this case, as is obvious, the time required for the entire processing by the cooperation flow 501 (the processing based on the tasks indicated by the task icons 503 and 504) is longer than a time limit of 600 sec. Such display allows the user to comprehend at a glance that the job cannot be complete within the time limit. The user therefore instructs to change a current function set in the cooperation flow so as to complete the job within the time. As a method for this operation, this embodiment will exemplify a method of manually changing settings (FIG. 5D) or a method of automatically changing settings (changing settings by using a list in which the priority order of function change is set (FIG. 5F)).

In the method of manually changing settings, which is shown in FIG. 5D, the user changes the setting contents of function items of the task in a list 517 to those in a list 518 at the time of execution of a cooperation flow by using a predetermined user interface. In this manner, the user can edit a cooperation flow to complete a task within a set time limit by changing the setting contents of desired function items. With the function change shown in FIG. 5D, the size of the task icon 503 in the cooperation flow in FIG. 5C is changed to that of the task icon 503 in FIG. 5E, and the size of the task icon 504 in the cooperation flow in FIG. 5C is changed to that of the task icon 504 in FIG. 5E. With this operation, it is expected that the modified cooperation flow can be executed and the job can be completed within the set time.

Figure 5E:
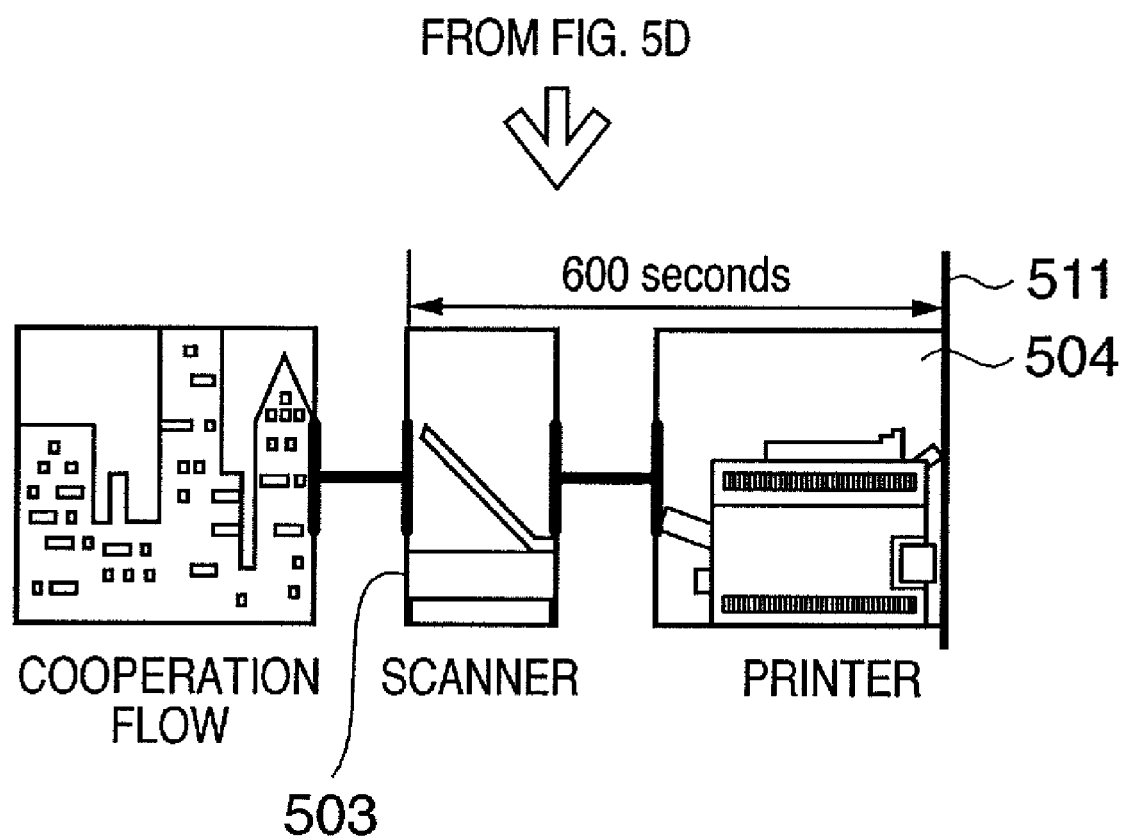
Figure 5F:
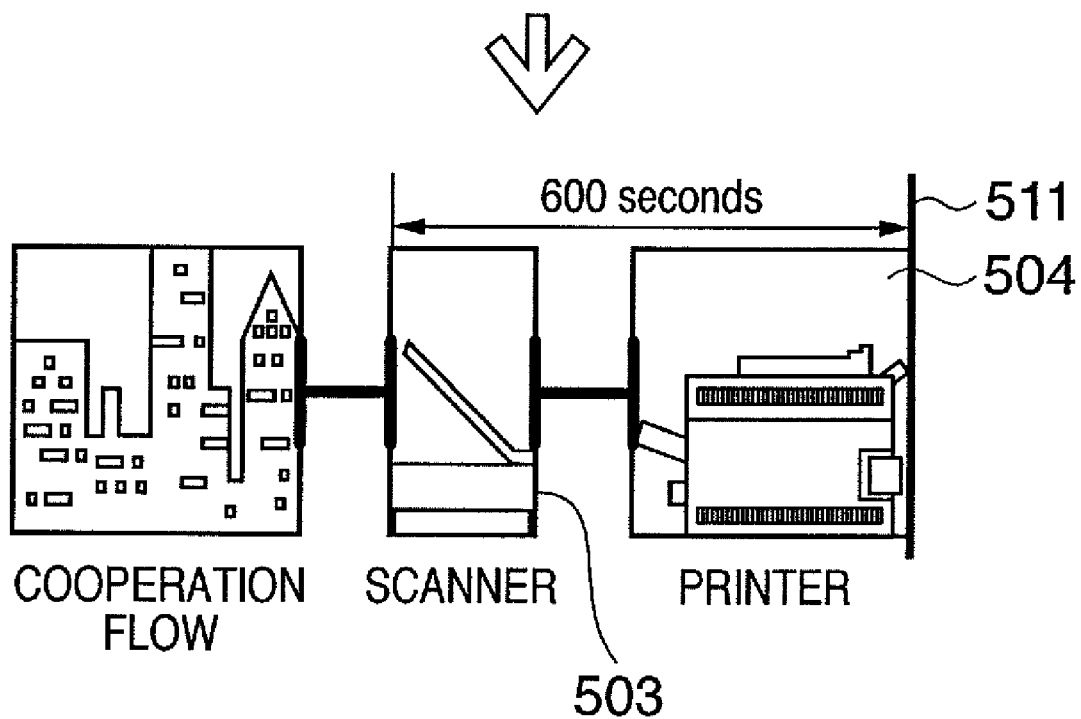

In the case of function change based on priority order setting shown in FIG. 5F, a function item to be adjusted is selected in accordance with the priority order designated in advance and is changed. Such processing is performed until the designated time limit is not exceeded. This makes it possible to change the above cooperation flow to a cooperation flow which can be executed within the time limit. The changed functions can also be reported in the form of a list like that shown in FIG. 10B to be described later. In this case, in the cooperation flow, the task icons 503 and 504 are displayed with their sizes being changed as shown in FIG. 5F. This allows the user to determine how much ratio of the processing time each task occupies.

<Interface for Creation of Cooperation Flow>

Figure 6A:
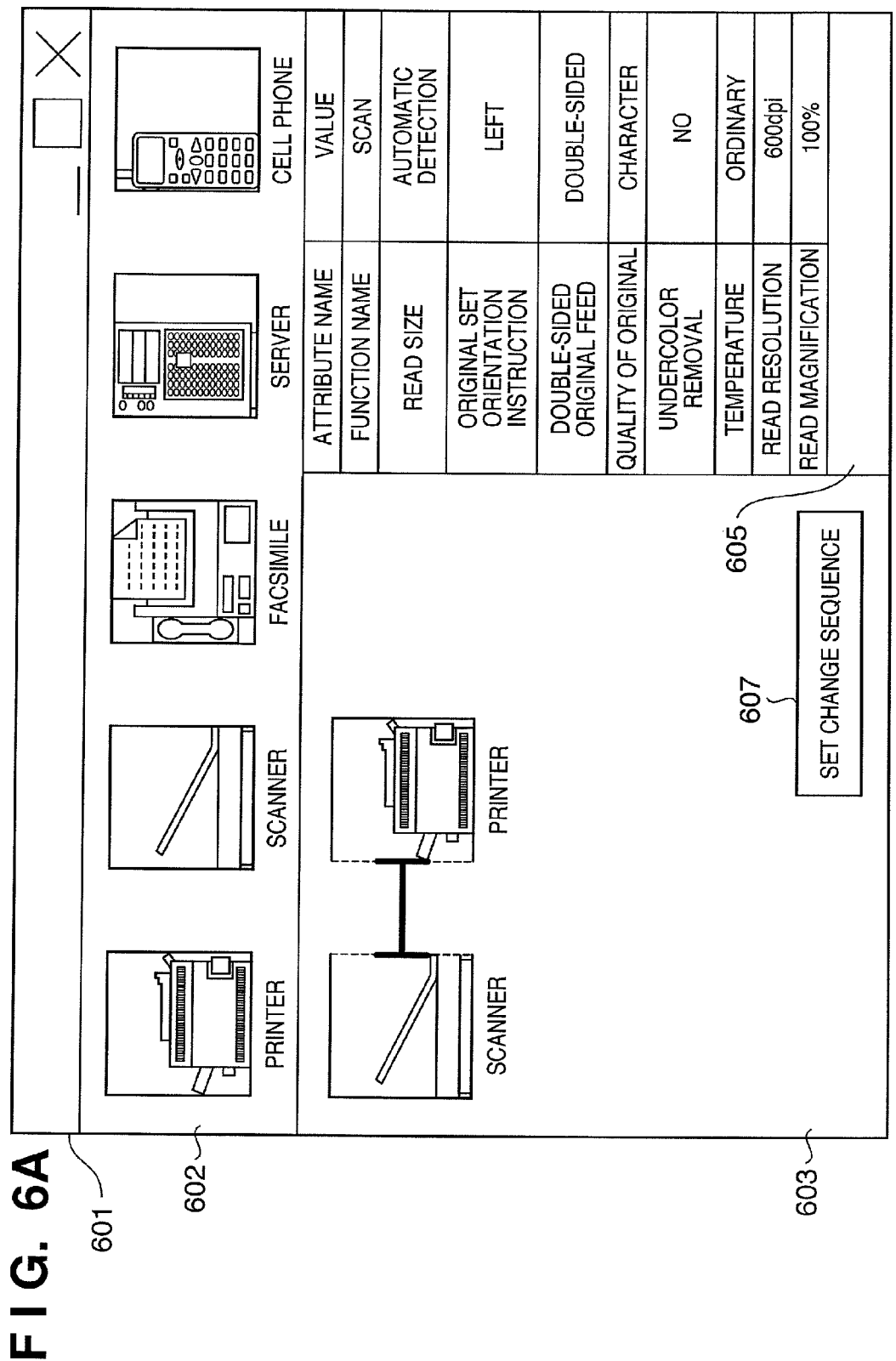
FIG. 6A is a view showing an example of a GUI for the creation of a cooperation flow in the first embodiment.
Figure 6B:
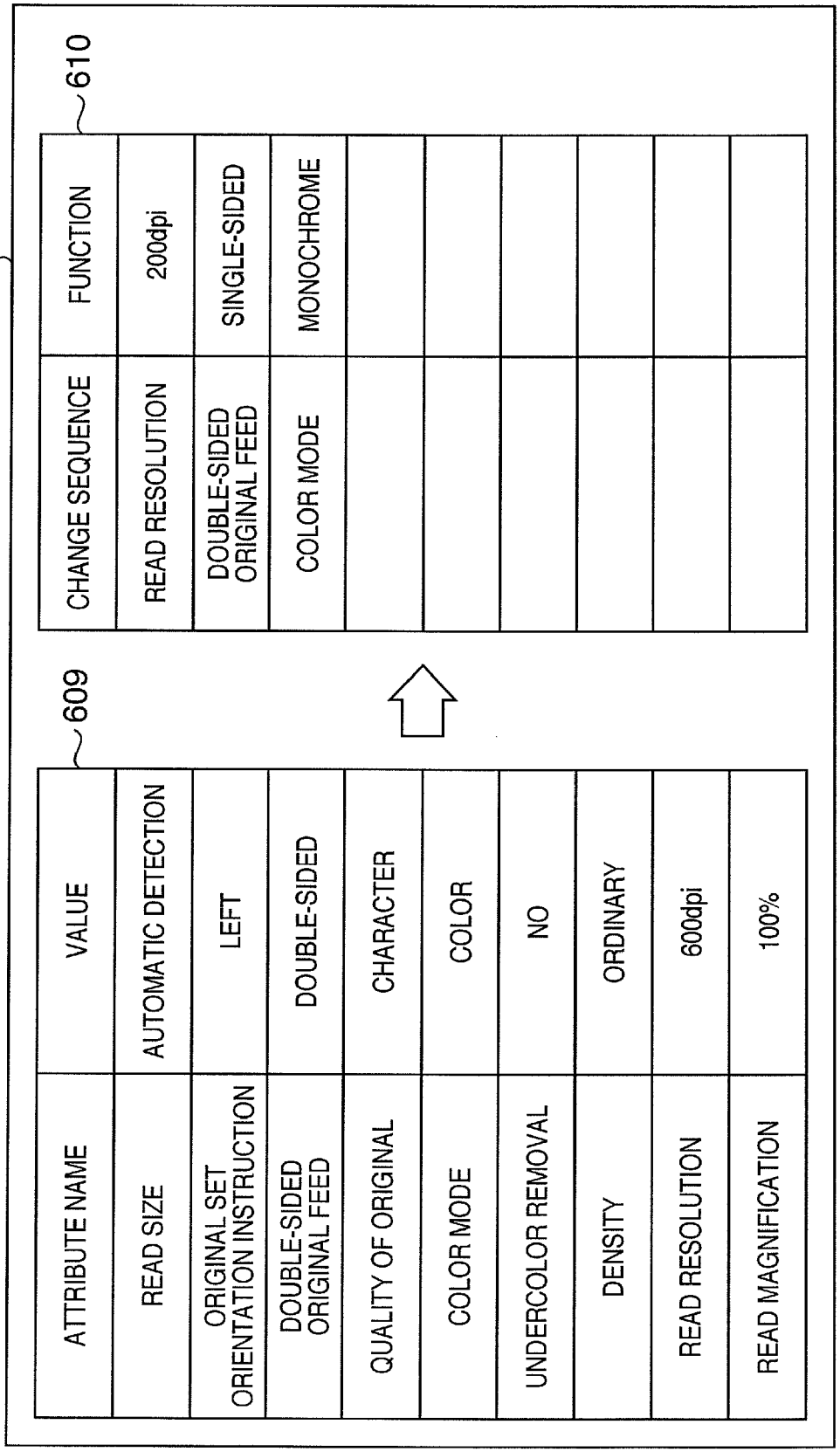
FIG. 6B is a view showing an example of a GUI for the creation of a cooperation flow in the first embodiment.

FIG. 6A is a view showing an example of a cooperation flow creation window 601 as a GUI window for defining a cooperation flow. As described above, the user can create and edit a cooperation flow by using the client PC 12. When a cooperation flow creation/editing instruction is issued, the client PC 12 displays the cooperation flow creation window 601 shown in FIG. 6A. Note that the client PC 12 is an ordinary general-purpose computer (personal computer) and its arrangement is known and hence a description thereof will be omitted. The client PC 12 executes a cooperation flow creation application to provide a user interface like that shown in FIGS. 6A and 6B which is used to create a cooperation flow (cooperation flow definition information described with reference FIG. 4). The cooperation flow creation window 601 comprises a task window 602, main window 603, and property window 605. The task window 602 displays various function tasks to be cooperated. The main window 603 allows to create a cooperation flow by locating function tasks to be used and creating linkages between them. The property window 605 provides a function of setting details for each task displayed on the main window 603.

The cooperation flow operator can define a cooperation flow on the main window 603 by dragging and dropping the icon of each function task on the task window 602 onto the main window 603. The cooperation flow operator can set the function of a given task in detail by editing the contents displayed on the property window 605.

The main window 603 includes a button 607 for setting a change sequence. Clicking this button allows to display a change sequence setting window 608 shown in FIG. 6B. This window displays set values 609 of the functions set on the property window 605 and a sequence 610 of designating the sequence of functions to be changed at the time of function change. In setting a change sequence on the change sequence setting window in FIG. 6B, the change sequence of attributes can be set across all the tasks contained in the cooperation flow set on the main window 603. That is, in the case of a cooperation flow like that shown in FIG. 6A, the user can assign, for example, the first priority to a given attribute in a scan task, and the second priority to a given attribute in a print task.

<Execution Processing of Cooperation Flow by Cooperation Flow Execution Device>

The execution processing of a cooperation flow by this embodiment will be described below. The following description will be made on the assumption that the print processing apparatus A 16 is a cooperation flow execution device.

Figure 16:
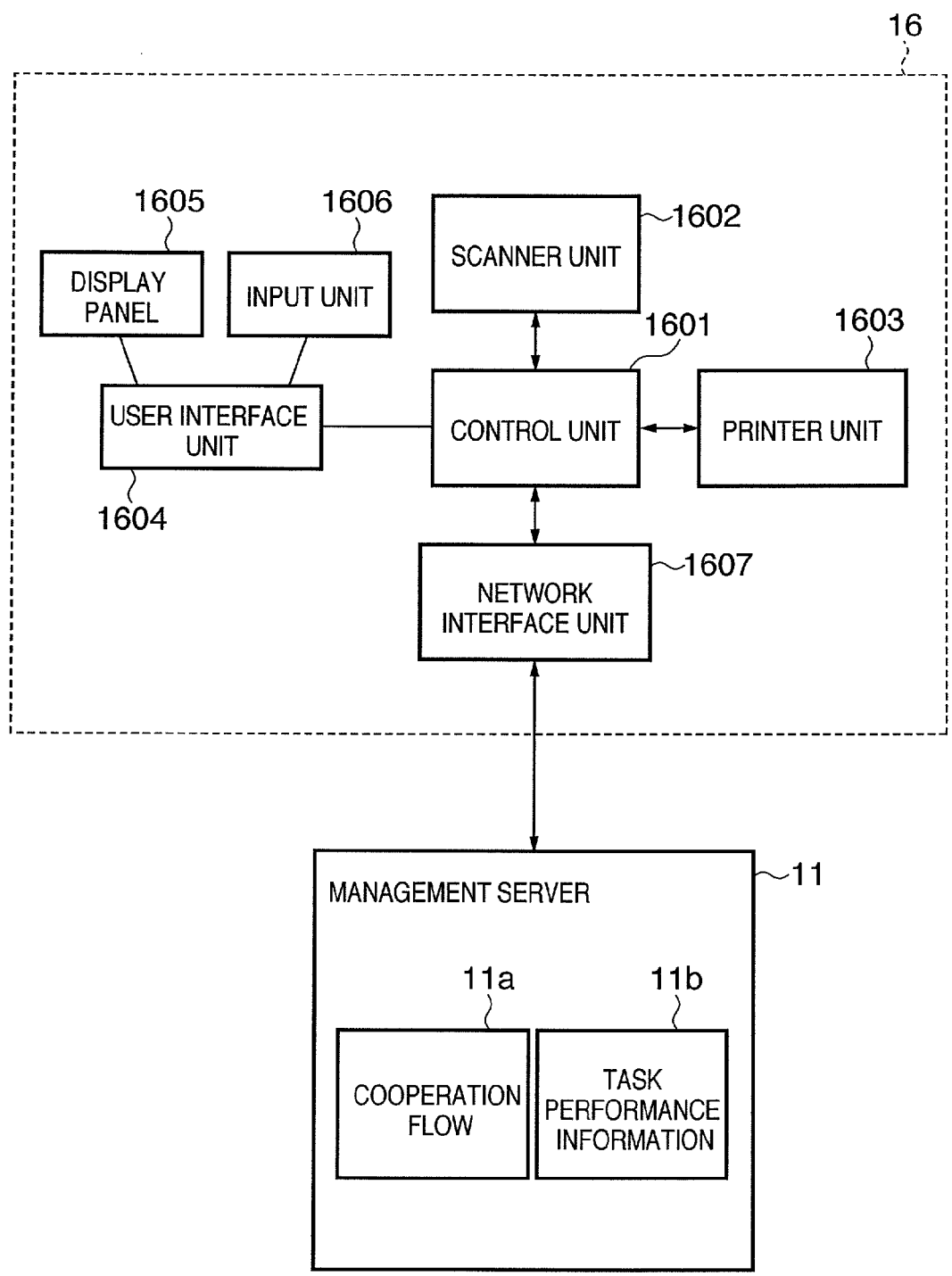
FIG. 16 is a block diagram showing an example of the arrangement of a print processing apparatus according to the first embodiment.

FIG. 16 is a block diagram showing the arrangement of the print processing apparatus A 16 according to this embodiment. Assume that the print processing apparatus A 16 is an MFP (multi-function peripheral). Referring to FIG. 16, a control unit 1601 comprises a CPU and memory (not shown), and controls each unit of the print processing apparatus A 16. A scanner unit 1602 creates image data by optically reading an original image. The control unit 1601 can execute a scan task in cooperation with the scanner unit 1602. This scan task is registered in the task list DB 13. A printer unit 1603 forms image data as a visible image on a recording medium. The printer unit may use any kind of print scheme, e.g., an inkjet scheme or laser beam scheme. The control unit 1601 can execute a print task in cooperation with the printer unit 1603. This print task is registered in the task list DB 13.

A user interface unit 1604 comprises a display panel 1605 and an input unit 1606. The display panel 1605 can display windows for providing various kinds of user interfaces in addition to the windows described with reference to FIGS. 5A to 5F. The user uses the input unit 1606 to perform various input operations, e.g., designating a desired cooperation flow by using a user interface on the display panel 1605 or input information about job data required to estimate a processing time.

A network interface unit 1607 is an interface for connecting a network to the corresponding apparatus.

The management server 11 manages a plurality of cooperation flows 11a and function information 11b of each task. The print processing apparatus A 16 downloads a cooperation flow to be executed from the management server 11 through the network interface unit 1607. The print processing apparatus A 16 also acquires the function information of each task used in a cooperation flow to calculate a processing time for each job.

<Execution Flow (Manual Setting Change)>

Figure 7:
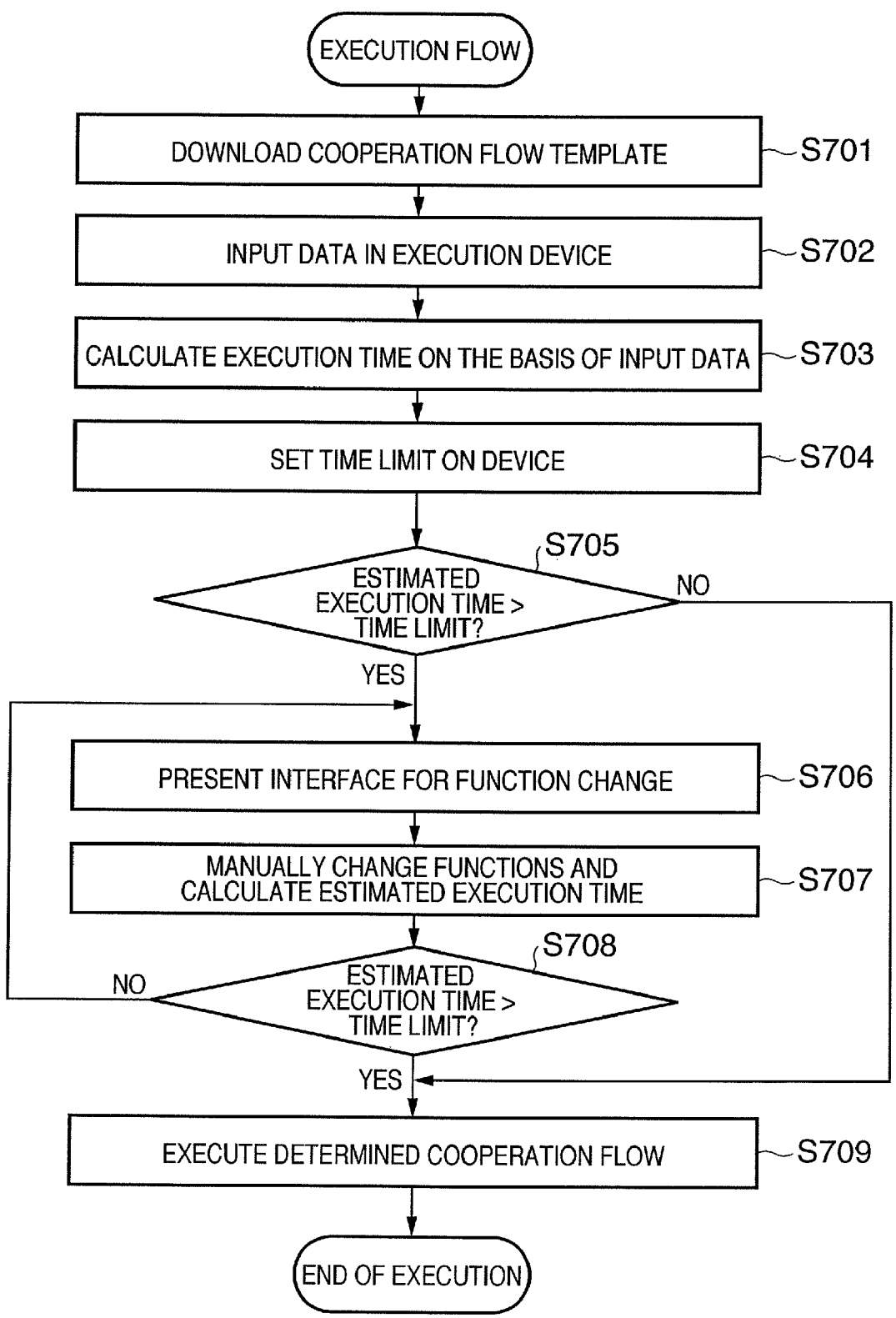
FIG. 7 is a flowchart for explaining the execution processing of a cooperation processing flow in the first embodiment.

FIG. 7 is a flowchart for explaining the processing to be performed at the time of the execution of a cooperation flow according to this embodiment. The control unit 1601 executes the following processing by causing the CPU to execute the control program stored in the memory. As described above, in the client PC 12, the cooperation flow created by using the main window 603 is registered in the management server 11. First of all, in step S701, the print processing apparatus A 16 as a cooperation flow execution device invokes the cooperation flow to be executed from the management server 11 in accordance with the settings made by a cooperation flow operator (user) through the user interface unit 1604. The evoked cooperation flow is downloaded to the print processing apparatus A 16. In step S702, the print processing apparatus A 16 receives information about the job (input data) to be processed by using the cooperation flow through the user interface unit 1604. In step S703, the print processing apparatus A 16 calculates the estimated value of the execution time (to be referred to as an estimated execution time hereinafter) required when the input data input in step S702 is processed by the cooperation flow. That is, the print processing apparatus A 16 acquires the performance of each task contained in the cooperation flow from the task performance information 11b managed by the management server 11, calculates a processing time for each input task, and acquires an estimated execution time for the cooperation flow by adding the processing times. Assume that a print task or a scan task is a task which is executed by the print processing apparatus A 16. In this case, if the print processing apparatus (cooperation flow execution device) can comprehend the performance of the task, there is no need to acquire a task performance from the management server 11.

The user then inputs a time limit concerning the processing time for the input job based on the cooperation flow to the print processing apparatus A 16 (step S704). The user can set a desired time limit through an arbitrary user interface. For example, FIG. 5C shows a state wherein "600 sec" is set.

In step S705, the print processing apparatus A 16 compares the time limit set by the user in step S704 with the estimated execution time calculated in step S703. If this comparison result indicates that the estimated execution time is equal to or shorter than the time limit, the process advances to step S709 to directly execute the cooperation flow. If the estimated execution time is longer than the limit time, the process advances to step S706 to feed back the result to the user and present a user interface for changing function settings. For example, as shown in FIG. 5C, information indicating that the processing time for the cooperation flow exceeds the time limit is displayed on the display panel 1605. At this time, the widths of the task icons 503 and 504 (widths in the time axis direction) are set in accordance with the estimated execution time.

In this processing, since the user manually changes setting contents, a user interface containing the list 517 shown in FIG. 5D is presented on the display panel 1605. In this user interface, the user can change the set states of the fields of "value". For example, the user can change the attribute value "double-sided original feed" to "single-sided". When the user selects the field of a given value of a given attribute, a list of values which can be set is displayed. The user can designate a desired value for a function item in the list by using the user interface unit 1604 (input unit 1606).

When the set state is changed, an estimated execution time required for the processing of the input data is calculated again in step S707. If the calculated estimated execution time becomes equal to or shorter than the set time limit, since it indicates that a cooperation flow within the set time limit can be acquired, the process advances from step S708 to step S709. In step S709, the input data is processed in accordance with the cooperation flow changed in step S707. If the estimated execution time is longer than the time limit, the process returns from step S708 to step S706 to repeat the above processing. That is, the widths of the task icons are determined to represent the estimated execution time calculated in accordance with the function after the change, thereby displaying information like that shown in FIG. 5C. Processing and a function in the cooperation flow are changed by using the interface shown in FIG. 5D. It is obvious that even if it is determined in steps S705 and S708 that the estimated execution time does not become equal to or shorter than the time limit, operation may be performed to forcibly execute the cooperation flow.

The above processing will be further described with reference to FIGS. 5A to 5F. Assume that the cooperation flow 501 is downloaded from the management server 11 to the print processing apparatus A 16 (step S701). The cooperation flow 501 comprises a scan task (the task icon 503) and a print task (the task icon 504), and information like that shown in FIG. 5A is displayed on the display panel 1605. The print processing apparatus A 16 then calculates an estimated execution time for the cooperation flow 501 on the basis of the data input from the user (steps S702 and S703). In this case, the time calculated for each task is reflected in the width of each task icon, and the overall size of the cooperation flow 501 is made to correspond to the total estimated execution time. That is, the sizes of the task icons 503 and 504 shown in FIG. 5A change to those of the task icons 503 and 504 shown in FIG. 5B.

When the user sets a time limit concerning the cooperation flow (step S704), a bar 511 indicating the set time limit is added to the cooperation flow for which the estimated execution time has been calculated, as shown in FIG. 5C. If this time limit is equal to or shorter than the calculated estimated execution time and a manual change instruction is issued, a predetermined user interface for changing the contents of the settings 517 shown in FIG. 5D is presented (steps S705 and S706). When the settings are changed to, for example, the list 518 by using this user interface so as to complete the processing within the set time limit (step S707), it indicates that a cooperation flow which can be processed within the time limit is created (step S708). At this time, the widths of the task icons of the cooperation flow are updated to the widths in the horizontal direction (time direction) which correspond to the processing time calculated again in accordance with the setting change. As a result, for example, information like that shown in FIG. 5E is displayed to allow the user to easily determine that the processing is complete within the time limit.

The user finally executes the changed cooperation flow (FIG. 5E) by using the print processing apparatus A 16 (step S709).

It suffices to extract changed contents of settings and present the extracted contents altogether to the user. For example, presenting only the changed contents of the settings to the user as shown in FIG. 8 allows the user to immediately comprehend the changed contents, thus providing convenience for the user.

<Execution Flow (Automatic Setting Change)>

Figure 9A:
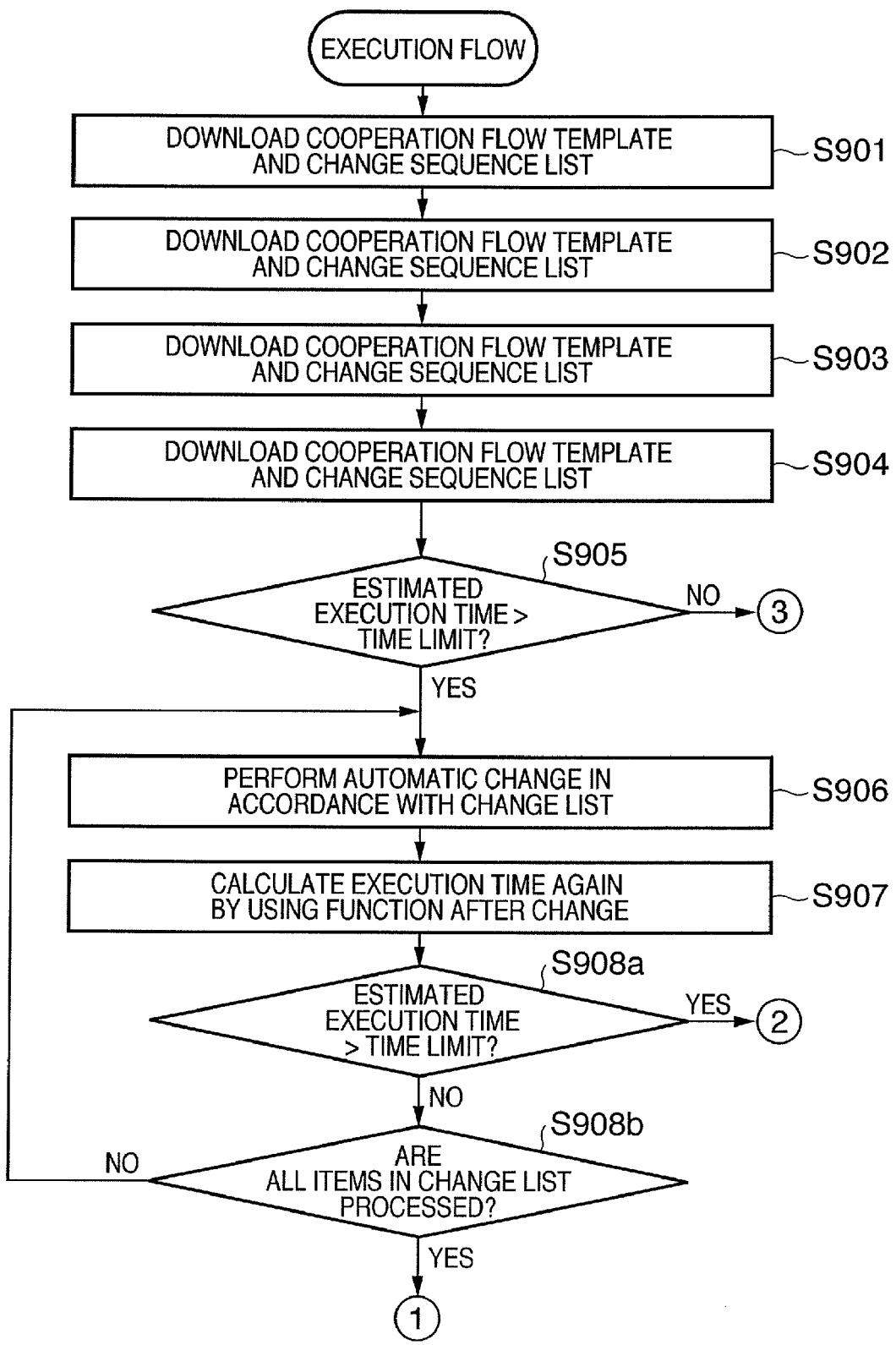
FIGS. 9A and 9B show a flowchart for explaining the execution processing of a cooperation processing flow in the first embodiment.
Figure 9B:
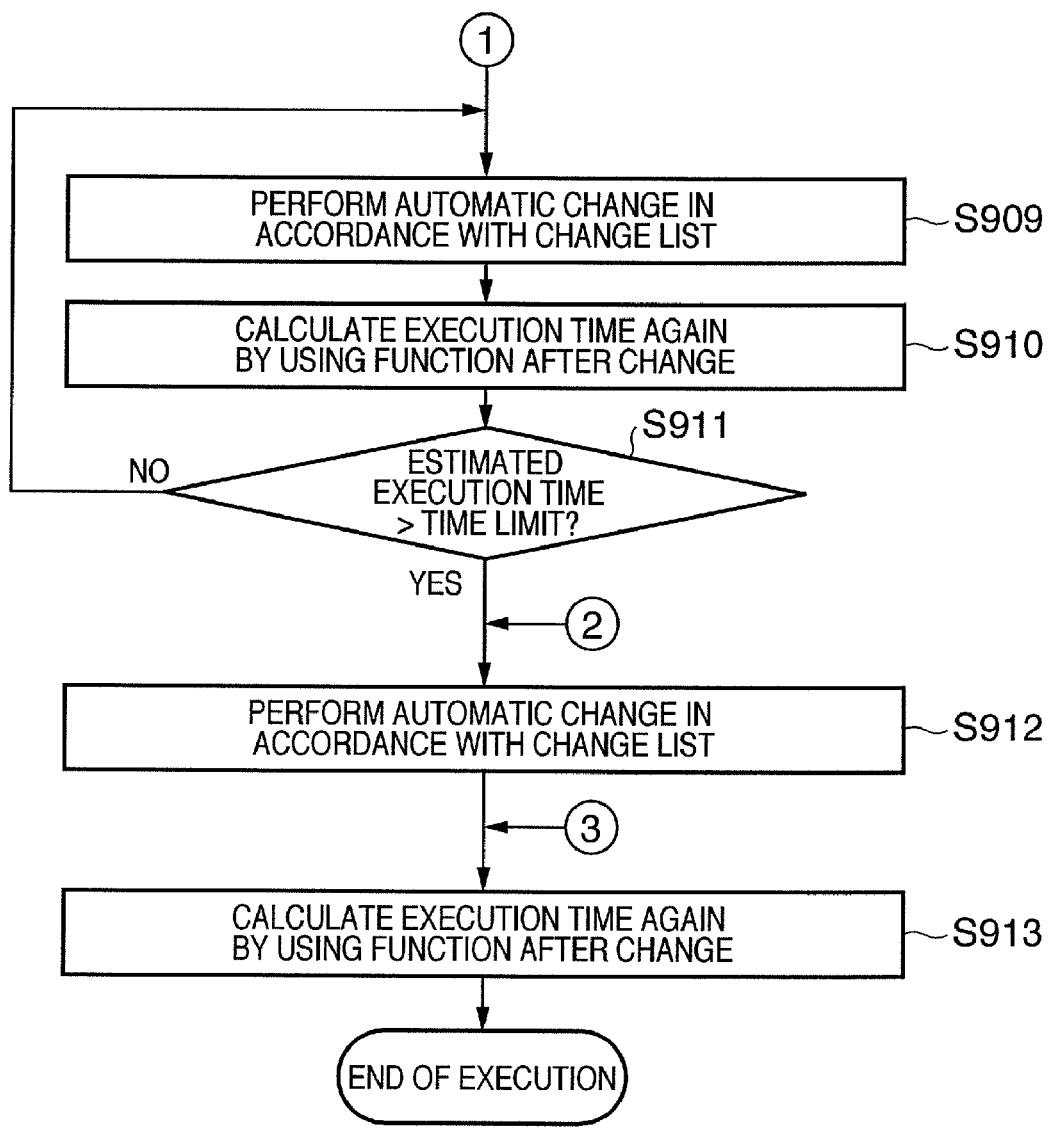

FIGS. 9A and 9B are a flowchart for explaining processing (at the time of automatic setting change) at the time of execution of a cooperation flow in this embodiment. The cooperation flow created on the cooperation flow creation window 601 is registered in the management server 11.

In step S901, the cooperation flow operator (user) downloads a cooperation flow and a change sequence list associated with the flow from the management server 11 to the print processing apparatus A 16 as a cooperation flow execution device. For example, as shown in FIG. 10A, the change sequence list indicates the sequence of changing processes (setting contents) in the cooperation processing flow so as to make an estimated execution time fall within a set time limit when the estimated execution time exceeds the time limit. In step S902, the user performs operation to input jobs (input data) to be input to the cooperation flow to the print processing apparatus A 16. In step S903, the print processing apparatus A 16 calculates an estimated execution time when the input data are processed by the cooperation flow downloaded in step S901. In step S904, the user is caused to input a time limit within which the cooperation flow is to be executed.

In step S905, the print processing apparatus A 16 compares the time limit input in step S904 with the estimated execution time calculated in step S903. If the comparison result indicates that the estimated execution time is equal to or shorter than the time limit, the process advances from step S905 to step S913 to directly execute the cooperation flow.

If the execution time is longer than the time limit, functions to be changed are sequentially selected from the change sequence list (FIG. 10A) in step S906 to change functions/processes set in the cooperation flow. In step S907, an execution time in a case wherein the data input in step S902 is processed by the cooperation flow after the function change, is calculated again. In step S908a, the print processing apparatus A 16 compares the time limit input in step S904 with the estimated execution time calculated in step S907. If the estimated execution time is equal to or shorter than the time limit, the process advances to step S912 to display a function list indicating the changed functions as shown in, for example, FIG. 10B. The process then advances to step S913 to execute the cooperation flow for the data input in step S902 in accordance with the changed settings.

If it is determined in step S908a that the estimated execution time is still longer than the time limit, the process advances to step S908b. It is determined in step S908b whether the process has changed all the functions in the change sequence list. If there is any function which has not been changed, the process returns to step S906 to repeat the above processing. The above processing in steps S906 to S908a sequentially changes functions written in the change sequence list until the execution time falls within the time limit.

If the estimated execution time does not fall within the time limit by changing the functions written in the change sequence list, i.e., it is determined in step S908b that the process has changed all the functions written in the change sequence list, the process advances to step S909 to perform manual function setting. The processing in steps S909 to S911 is the same as the above manual setting change processing (steps S706 to S708).

If the function settings in the cooperation flow are manually changed and the execution time falls within the time limit, the process advances from step S911 to step S912 to display a function list indicating the changed functions as shown in, for example, FIG. 8 or 10B. In this case, the automatically and manually changed contents are displayed. The process then advances to step S913 to execute the cooperation flow for the data input in step S902 in accordance with the changed settings.

It is obvious that even if it is determined in steps S905, S908, and S911 that the execution time does not become equal to or shorter than the time limit, operation may be performed to forcibly execute the cooperation flow.

The above processing will be further described with reference to FIGS. 5A to 5F. First of all, a cooperation flow and a change sequence list are downloaded from the management server 11 to the print processing apparatus A 16 (S901). In this case, the cooperation flow is the cooperation flow 501 comprising a scan task indicated by the task icon 503 and a print task indicated by the task icon 504. Note that the downloaded change sequence list is like that shown in FIG. 10A.

When the user inputs data to be processed (S902), this apparatus calculates an execution time (estimated execution time) estimated to be required for each task to process the data on the basis of the input data (S903). At this time, the time calculated for each task is reflected in the width of a corresponding task icon, and the overall size of the cooperation flow 501 corresponds to the total estimated execution time. That is, the task icons 503 and 504 are displayed with the sizes shown in FIG. 5B.

When the user sets a time limit concerning the cooperation flow (step S904), the bar 511 indicating the set limit time is added to the display of the cooperation flow for which the estimated execution time has been calculated, as shown in FIG. 5A. If this time limit is equal to or shorter than the calculated estimated execution time, function settings of the cooperation flow change to make the estimated execution time fall within the time limit (S905 and S906). At this time, in step S901, the change sequence list which is downloaded together with the cooperation flow is used. In this embodiment, the process changes function settings item by item in accordance with the change sequence list, and it is determined whether the estimated execution time falls within the time limit. For example, according to the change sequence list in FIG. 10A, first of all, the resolution changes from 600 dpi to 200 dpi, and an estimated execution time for the cooperation processing flow is calculated (S907), and it is determined whether the estimated execution time falls within the time limit (S908a). If the estimated execution time is longer than the time limit, the setting of "printing method" is changed (S908b and S906). That is, the setting "double-sided" changes to the setting "single-sided". In this state, an estimated execution time for the cooperation flow is calculated, and it is determined whether the execution time falls within the time limit. In this manner, functions are sequentially changed in accordance with the change sequence list until the estimated execution time falls within the time limit (S908a).

If, for example, the estimated execution time falls within the time limit when "double-sided original feed" changes to "single-sided", the changed state at this time is displayed as shown in FIG. 5F, and the changed contents are displayed as shown in FIG. 10B (S912). In this case, however, since the color mode does not change, only items (1) and (2) in FIG. 10B are displayed, but "(3) color (16 gray levels)→monochrome (two gray levels)" is not displayed. The apparatus then processes the input data in accordance with the cooperation flow whose settings have been changed (S913).

If the execution time does not fall within the time limit even after all the items written in the change sequence list change, the manual setting processing in FIGS. 5D to 5E is performed (S909 to S911).

As described above, since the above automatic change processing of this embodiment automatically adjusts a cooperation flow in accordance with a change sequence list, setting for the cooperation flow can be easily made so as to complete processing within a desired time limit with almost no user intervention.

Second Embodiment

The second embodiment is configured to determine a processing time for each task (allocating a limit time for each task) by causing the respective tasks in a cooperation flow created on the basis of a given rule to negotiate with each other within a given limitation in consideration of preferred tasks and the like. In the second embodiment, such function adjustment for a cooperation flow will be referred to as an automatic adjustment function. Control for making an estimated execution time for a cooperation flow fall within a time limit by using such an automatic adjustment function will be described below.

<Automatic Adjustment Method for Cooperation Flow with Priorities being Assigned to Tasks>

FIGS. 11A and 11B are views for explaining an automatic adjustment method for a cooperation flow with priorities being assigned to tasks. For example, setting is made in a cooperation flow 1102 comprising tasks indicated by task icons 1103 and 1104 in FIG. 11A so as to preferentially process the task indicated by the task icon 1103. One method of indicating such a set state is to indicate that the rectangle of the task icon is expressed by a dotted line or a solid line. Assume that in this case, a dotted line indicates that the process can change the corresponding task size in accordance with a processing time. In this case, when a dotted line expresses the right side of the task icon 1103, the right side pushes (controls) the left side of the task icon 1104 which is associated (linked) with the right side and expressed by a solid line. This indicates that a processing time is preferentially assigned to the task indicated by the task icon 1103. That is, the left side of the task icon 1104 moves in accordance with the movement of the right side of the task icon 1103. With this mechanism, when, for example, a time limit 1105 is generated, a priority is assigned to the task indicated by the task icon 1103 to ensure a processing time corresponding to a necessary estimated execution time. On the other hand, as a shorter processing time is assigned to the task indicated by the task icon 1104, function overflow tends to occur.

When a time limit is input and calculation is performed in accordance with a rule, for example, the size of the task icon 1103 is maintained as shown in FIG. 11B. On the other hand, the size of the task icon 1104 decreases, as shown in FIG. 11B. That is, a processing time required for the processing of the job is assigned to the scan task indicated by the task icon 1103 without any setting change for the function item. In contrast, a time shorter than an estimated processing time is assigned to the print task indicated by the task icon 1104. This causes function overflow 1106 in the task indicated by the task icon 1104, but causes no function overflow in the task indicated by the task icon 1103.

A cooperation flow processing method of determining the size of each task by making tasks negotiate with each other will be described next with reference to FIGS. 11C and 11D.

Figure 11C:
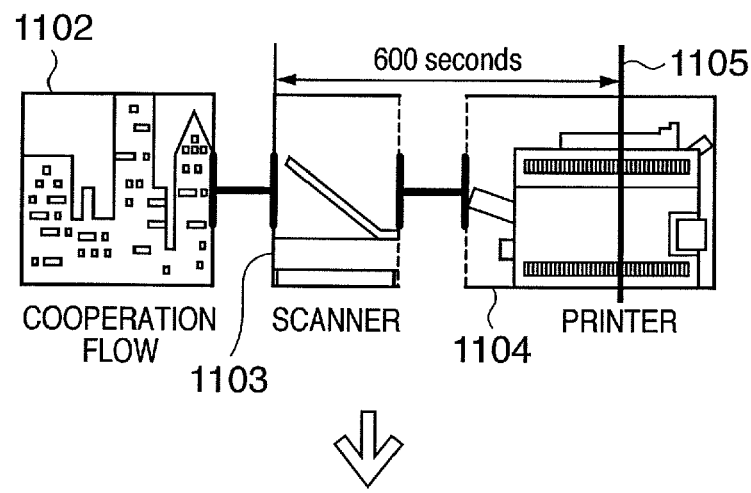
FIGS. 11C and 11D are views showing the concept of the solving technique using the automatic adjustment function in the second embodiment.

Referring to FIG. 11C, for example, in the case of the cooperation flow 1102 comprising the tasks indicated by the task icons 1103 and 1104, setting is made to equally process the tasks indicated by the task icons 1103 and 1104. This relationship can also be expressed by using the above rule of dotted lines and solid lines. In this case, expressing the right side of the task icon 1103 and the left side of the task icon 1104 by dotted lines make both the icons push each other. That is, size adjustment results will be assigned to the task icons 1103 and 1104. With this operation, if, for example, the time limit 1105 occurs, the task icons 1103 and 1104 decrease their sizes (processing times to be allocated) with each other within the time limit, thereby making the cooperation flow fall within the time limit. That is, the function overflow 1106 occurs in both the tasks indicated by the task icons 1103 and 1104. If a time limit is input and calculation is performed in accordance with the rule, for example, both the task icons 1103 and 1104 decrease in size as shown in FIG. 11D. That is, the processing times allocated to the two tasks are shorter than the necessary processing times. As a consequence, function overflow occurs in the tasks indicated by the task icons 1103 and 1104.

Figure 11D:
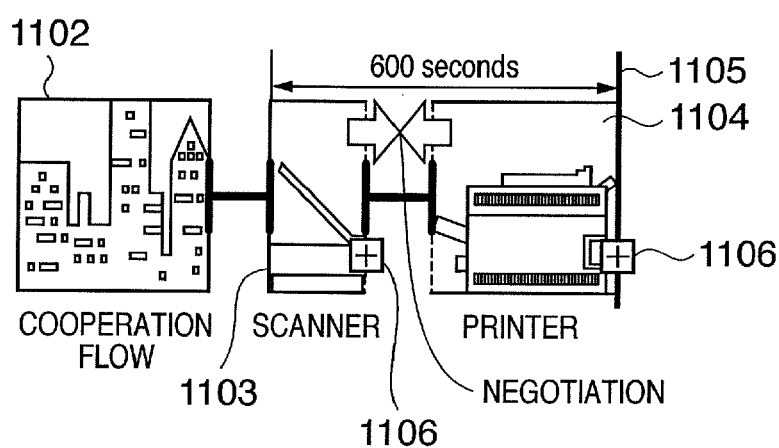

Note that the negotiation shown in FIGS. 11C and 11D indicates how the surplus time (the difference between the estimated execution time and the time limit) is equally covered by the two tasks. That is, the time allocated to each task is shortened by the time ½ the surplus time. However, the allocation of the surplus time is not limited to this, and the surplus time may be allocated to each task in accordance with the priority. For example, control can be made to allocate the time ⅓ the surplus time to a task with a higher priority, while allocating the time ⅔ the surplus time to a task with a lower priority. Although this embodiment exemplifies the cooperation flow comprising the two tasks, the present invention can be equally applied to a cooperation flow in which three or more tasks are cooperated with each other. If, for example, n tasks cooperate with each other, the 1/n the surplus time is allocated to each task.

Setting the above rule in the GUI at the time of creation of a cooperation flow makes it possible to create a cooperation flow with various movements so as to cope with the occurrence of a time limit. That is, making such setting in advance, the user can perform the intended function change more smoothly even when a time limit is set at the time of the execution of a cooperation flow.

<Interface for Creation of Cooperation Flow>

FIG. 12 shows an example of a GUI window for defining a cooperation flow having an automatic adjustment function, which is presented by the client PC 12. An automatic adjustment cooperation flow creation window 1201 comprises a task window 1202, main window 1203, automatic adjustment tool window 1204, and property window 1205.

The task window 1202 displays various function tasks which operate in cooperation with each other. The main window 1203 allows to create a cooperation flow by locating function tasks to be used and creating linkages between them. The automatic adjustment tool window 1204 provides various functions for setting an automatic adjustment function for each task of a cooperation flow. The property window 1205 display the detailed setting functions of the respective tasks displayed on the main window 1203.

The cooperation flow operator can define a cooperation flow on the main window 1203 by dragging and dropping the icon of each function task on the task window 1202 onto the main window 1203. In addition, applying various settings on the automatic adjustment tool window 1204 to the respective tasks makes it possible to easily add automatic adjustment functions. Dotted lines express the right side of a task 1207 and the left side of a task 1208 on the main window 1203. The two tasks connect to each other through a link 1209. Assume that there is a rule stating that a dotted line pushes a task connecting to it through a link. In this case, as described above, when a time limit is provided, a cooperation flow is created such that the tasks 1207 and 1208 push each other within the time limit. The cooperation flow operator can set the functions of the tasks in detail by editing the contents displayed on the property window 1205. In the second embodiment, a processing time is allocated to each task, and an estimated execution time is adjusted to become equal to or shorter than the allocated time for each task. Therefore, a change sequence list is created for each task.

<Execution Flow (Automatic Adjustment System)>

Figure 13A:
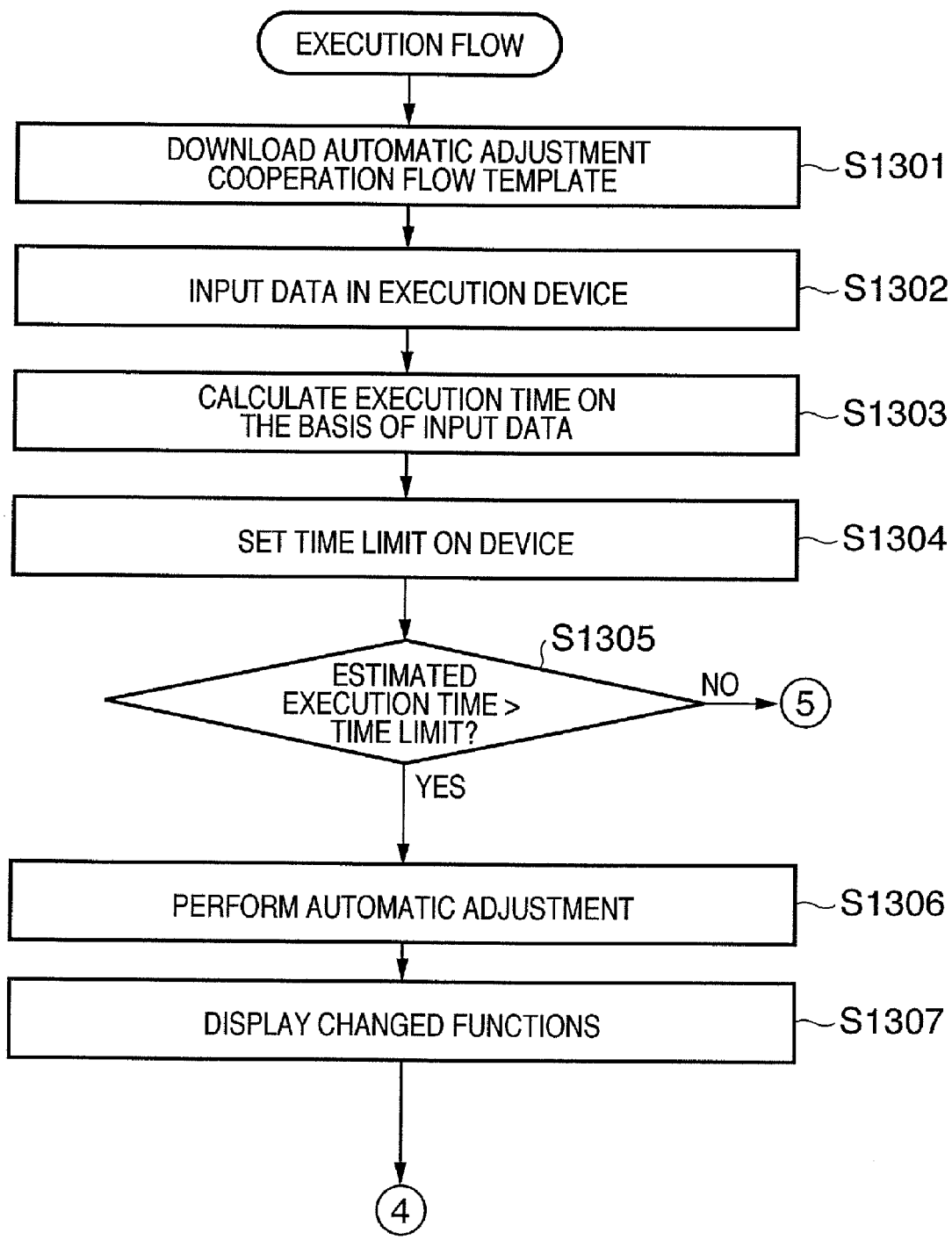
FIGS. 13A and 13B show a flowchart for explaining the execution processing of a cooperation processing flow in the second embodiment.
Figure 13B:
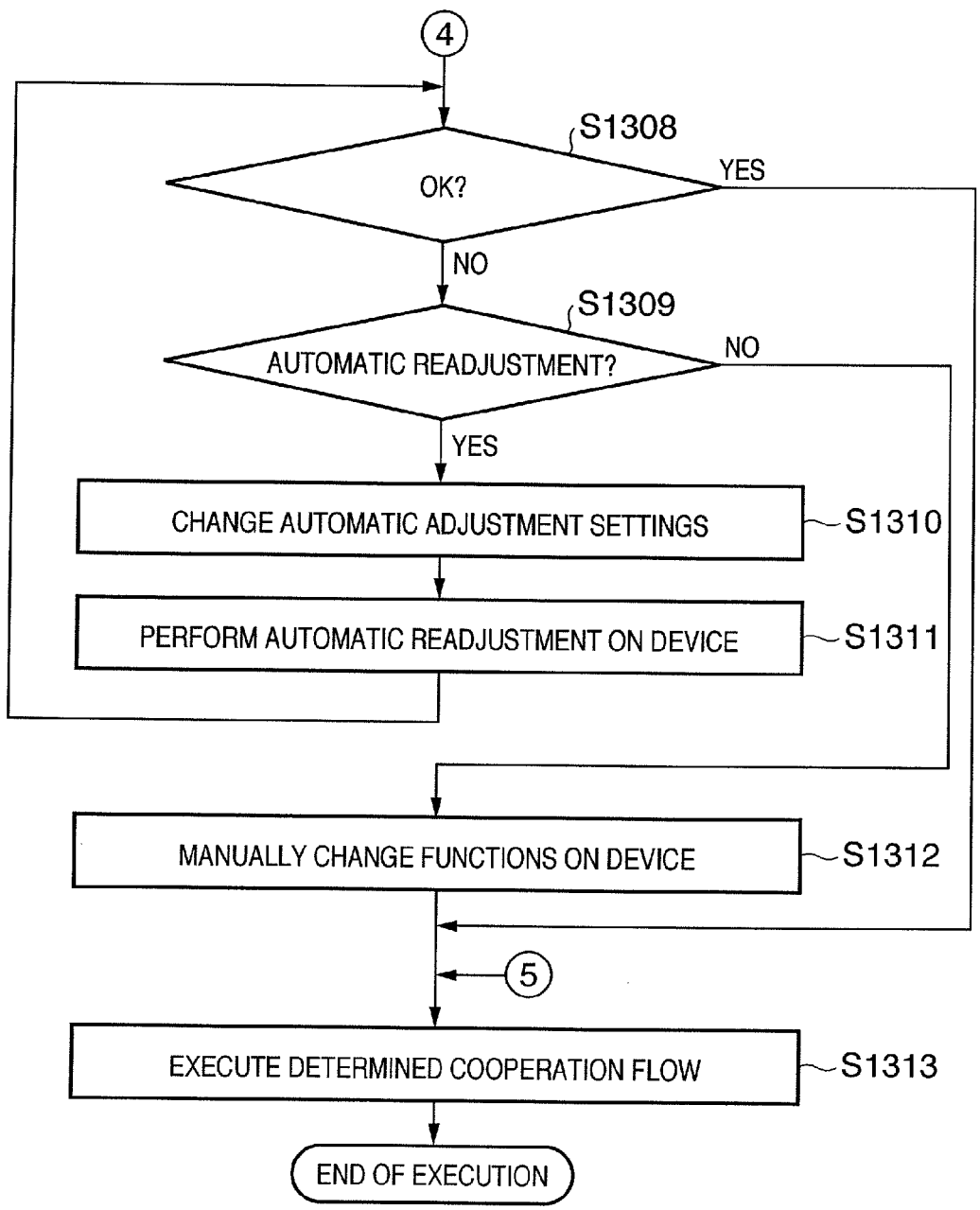

FIGS. 13A and 13B are a flowchart for explaining the execution processing of a cooperation flow according to the second embodiment. Assume that a management server 11 registers the cooperation flow created on the automatic adjustment cooperation flow creation window 1201. In step S1301, a print processing apparatus A 16 as a cooperation flow execution device downloads an automatic adjustment cooperation flow from the management server 11 in accordance with an instruction input from the cooperation flow operator (user). In step S1302, the user performs operation to input a job (input data) to be executed by using the cooperation flow. In step S1303, the apparatus calculates an estimated execution time in a case wherein the data input in step S1302 is processed by the cooperation flow downloaded in step S1301. In step S1304, a time limit concerning the processing of the input data is set in accordance with an operation input from the user.

In step S1305, the print processing apparatus A 16 compares the time limit input in step S1304 with the estimated execution time calculated in step S1303. If this comparison result indicates that the estimated execution time is equal to or shorter than the time limit, the process advances to step S1313 to directly execute the processing of the input data by the cooperation flow. If the estimated execution time is longer than the time limit, the process advances to step S1306 to automatically adjust the cooperation flow by using the method described with reference to FIGS. 11A to 11D. That is, the apparatus determines time allocation to each task and automatically adjusts that processing is complete within the time allocated to each task. Adjustment processing itself is performed to change each function in steps S905 to S908b by using the above method such that each task is complete within the allocated time. When the automatic adjustment is complete, the functions changed by the automatic adjustment are displayed in step S1307. Note that the above description has exemplified the case wherein time allocation to each task is performed by the automatic adjustment. Although the apparatus adjusts each function item of a task in the same manner as in the first embodiment, a change sequence list is prepared for each task. Alternatively, it suffices to automatically select function items associated with a task to be adjusted from a change sequence list like that in the first embodiment and sequentially change the set state of each item.

In step S1308, the user is inquired whether the change is OK. If the user inputs information indicating that the change is OK, the process advances to step S1313 to execute the processing of the input data in accordance with the changed cooperation flow. If it is not OK, the user is inquired in step S1309 whether each function is adjusted from the current state by changing the automatic adjustment settings or each function is changed manually. If the user issues an instruction to change settings by automatic adjustment, the process advances to step S1310 to make the user change settings such as the priority of each task in the cooperation flow. For example, the user may change the proportion of a surplus time allocated to each task. In step S1311, the print processing apparatus A 16 performs automatic adjustment of the cooperation flow again in accordance with the automatic adjustment method with the changed settings. The process returns to step S1308 to inquire the user again whether the adjustment result is OK.

If the process determines in step S1309 that each function is to be changed manually, the process advances from step S1309 to step S1312. In step S1312, manual function adjustment (S706 to S708) described in the first embodiment is performed.

In step S1313, the input data is processed in accordance with the cooperation flow.

The above processing will be further described with reference to FIGS. 14A to 14E, 15A, and 15B that show a specific example of the processing shown in FIGS. 13A and 13B.

Figure 14A:
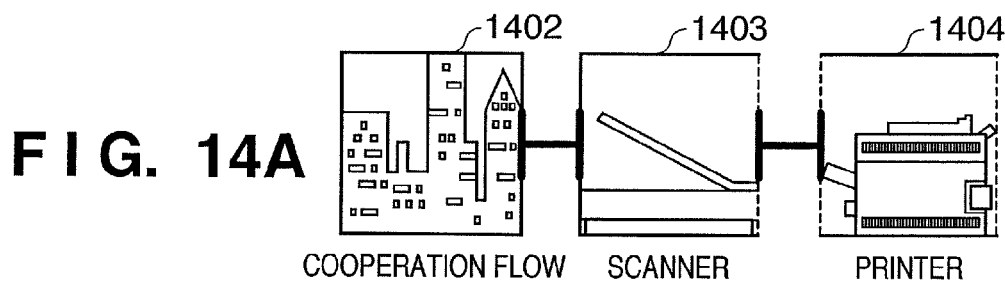
FIGS. 14A to 14E are views for explaining a specific example of a solving technique using an automatic adjustment function in the second embodiment.
Figure 14B:
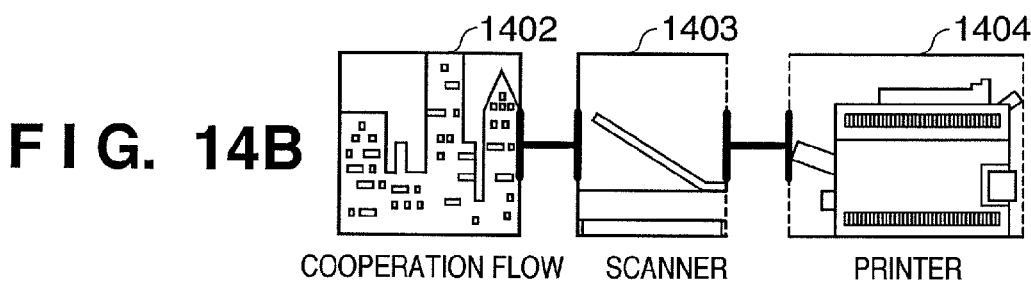
Figure 14C:
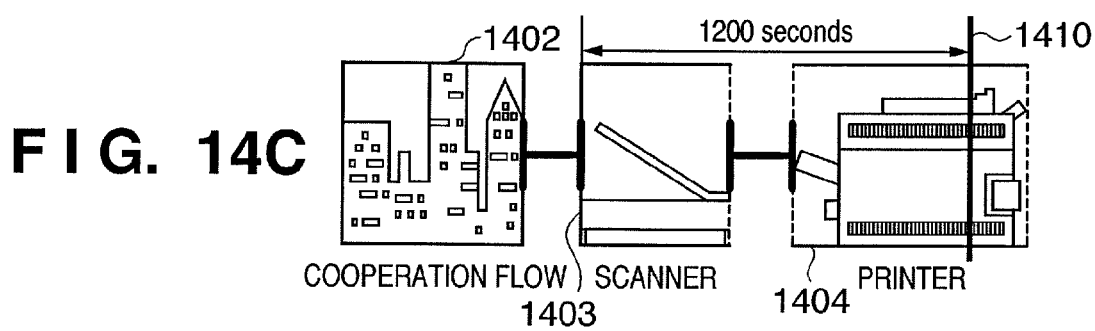

When the print processing apparatus A 16 as an execution device downloads a cooperation flow 1402 from the management server 11 (S1301), the flow is displayed as shown in FIG. 14A. In this case, the cooperation flow 1402 comprises a scan task and a print task respectively indicated by task icons 1403 and 1404. In this case, dotted lines express the right side of the task icon 1403 and the left and right sides of the task icon 1404.

The print processing apparatus A 16 calculates an execution time for processing by the cooperation flow (S1303) on the basis of the data input from the user (S1302). When this calculation result is reflected in the width of each task icon, the display shown in FIG. 14A changes to that shown in FIG. 14B. That is, the width of the task icon 1403 decreases, and the width of the task icon 1404 increases. At this time, the size of the cooperation flow 1402 in the horizontal direction which is indicated by the task icons 1403 and 1404 indicates the total execution time calculated in step S1303.

Figure 14D:
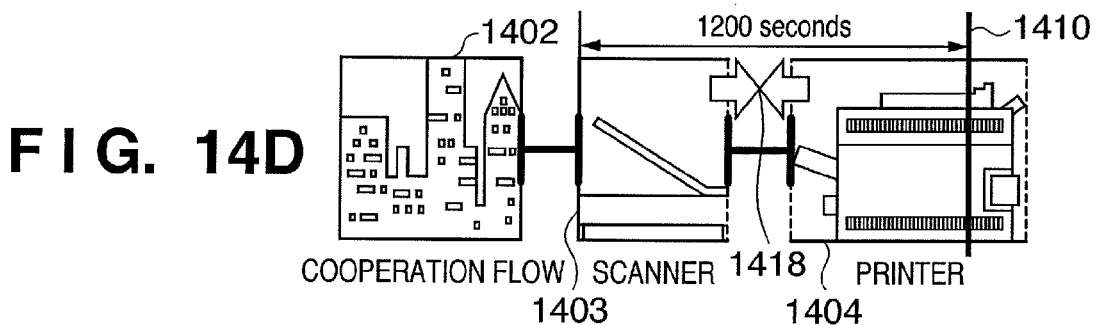

When the user sets a time limit 1405 (S1304), display 1410 (FIG. 14C) indicating the set time limit is added to the cooperation flow (FIG. 14B) for which the execution time has been calculated. Since this time limit is shorter than the execution time, the print processing apparatus A 16 performs automatic adjustment such that the execution time falls within the time limit (S1305 and S1306). In the case shown in FIG. 14C, since dotted lines express both the right side of the task icon 1403 and the left side of the task icon 1404, negotiation 1418 occurs to make the icons push each other as shown in FIG. 14D (S1306).

Figure 14E:
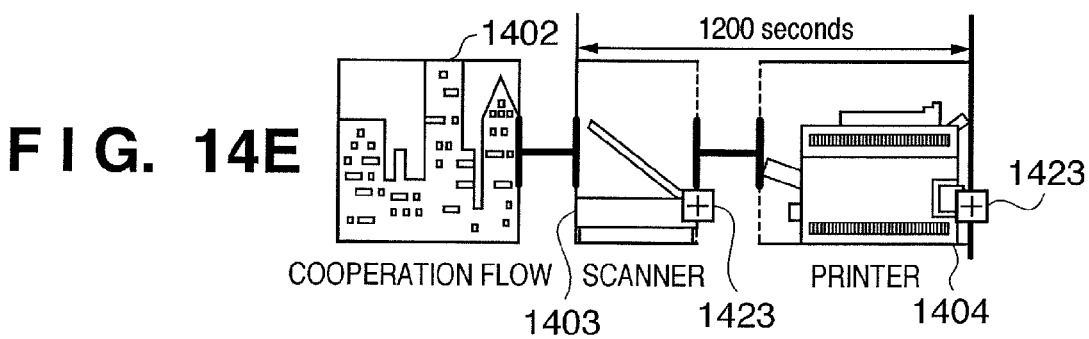

As shown in FIG. 14E, as a result of automatic adjustment by this negotiation, the cooperation flow 1402 with the execution time falling within the time limit is created (S1307). As a result, the task icons 1403 and 1404 of the cooperation flow 1402 have been changed from the state shown in FIG. 14B to the state shown in FIG. 14E by function change (the widths of both the icons have decreased). For this reason, function overflow has occurred in each task, and a mark 1423 indicates the state of each task.

Figure 15A:
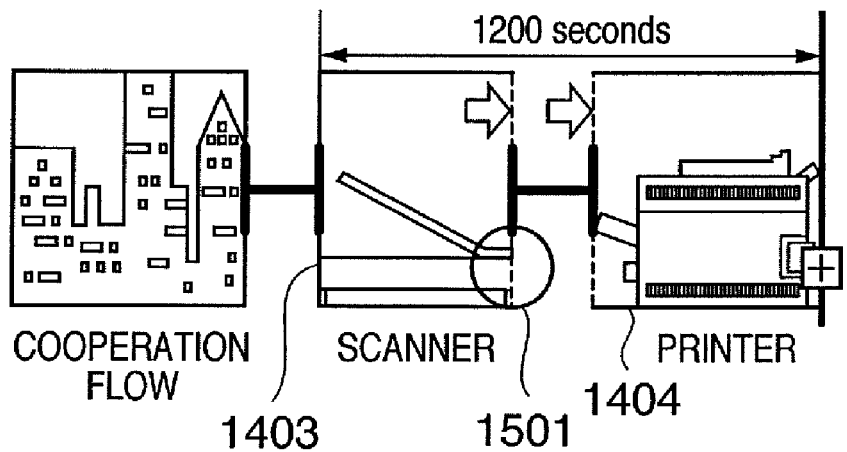
FIGS. 15A and 15B are views for explaining a specific example of a solving technique using an automatic adjustment function in the second embodiment.

FIG. 15A shows a state wherein readjustment is performed by re-setting an automatic adjustment cooperation flow on the print processing apparatus A 16 (S1308 to S1311). In this case, re-setting operation is performed to increase the priority (strength at the time of negotiation) of the scan task indicated by the task icon 1403 (S1310). As a result, the task icon 1403 indicating the scan task pushes the task icon 1404 indicating the print task slightly strongly, and hence the sizes of the two icons change to those shown in FIG. 15A. This may solve overflow in the task icon 1403 (1501). However, since the time limit remains unchanged, the task icon 1404 (print task) undergoes more function change.

Figure 15B:
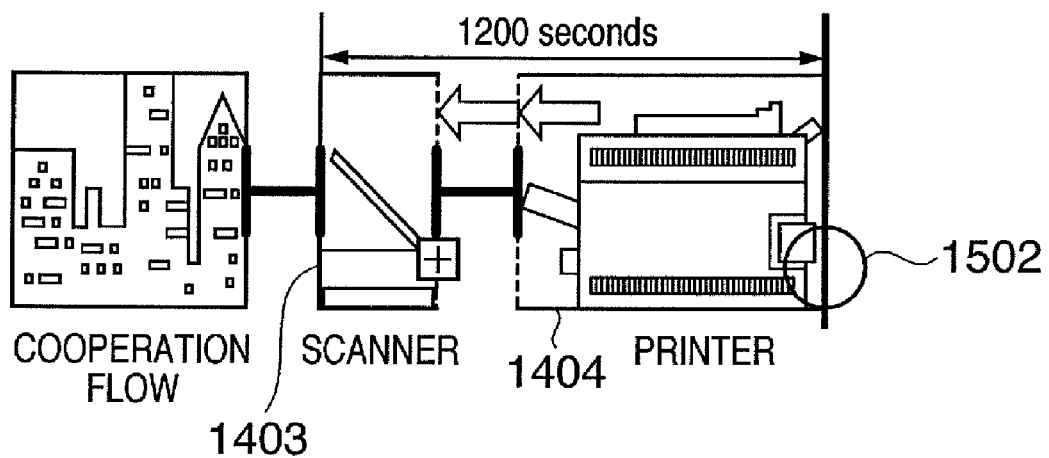

FIG. 15B shows how the user manually performs function change (S1312) in the print processing apparatus A 16. In this case, the embodiment tries to solve function overflow in the print task indicated by the task icon 1404 by further limiting the function of the scan task indicated by the task icon 1403. As a result, the sizes of the task icons 1403 and 1404 change to those shown in FIG. 15B. At this time, although the function overflow in the print task is solved (1502), more functions of the scant task are changed. Finally, when a desired cooperation flow is complete, as shown in FIGS. 15A and 15B, the user executes the cooperation flow by using the print processing apparatus A 16 (S1313).

Note that the same processing as that in the first embodiment is available for the above manual function change. In this embodiment, however, manual adjustment may be possible for each task. In this case, in performing adjustment, a user interface is provided, which makes the user select a task to be adjusted, and displays the function items of the selected task as shown in FIG. 5D, thereby changing the settings of the function items.

As described above, according to the above embodiment, adjustment is possible such that the execution time for a cooperation flow in which tasks which can be executed by devices connecting to each other through a network are cooperated to each other falls within a desired time limit. That is, the client (the user who uses the cooperation flow) can change the cooperation flow at the time of the execution of the cooperation flow such that the execution time falls within the time limit. Consequently, for example, when the user wants to complete a cooperation flow by the time a conference, meeting, preliminary assembly, or the like begins, he/she can easily create a cooperation flow which completes all the tasks within the time.

In addition, setting the priority order (change function list) of function change in a cooperation flow in advance makes it possible to save the user from manually changing functions, because the functions are automatically changed in accordance with the priority order.

Furthermore, creating an automatic adjustment cooperation flow makes it possible to save the user from manually changing functions and setting the priority order of many items, because the functions are changed in accordance with the priority order or priority levels of the respective tasks.

Since a priority order and priority levels can be set at the time of creation, functions can be reduced within a time limit so as to satisfy the user's intention as much as possible.

Although the embodiments have been described in detail above, the present invention can take embodiments of a system, apparatus, method, program, storage medium, and the like. More specifically, the present invention can be applied to a system constituted by a plurality of devices, or to an apparatus comprising a single device.

The present invention incorporates a case wherein programs of software for implementing the functions of the embodiments described above are directly or remotely supplied to a system or apparatus to cause the computer of the system or apparatus to read out and execute the programs, thereby implementing the functions. In this case, the programs to be supplied correspond to the flowcharts shown in the accompanying drawings in the embodiments.

The program codes themselves which are supplied and installed in the computer to allow the computer to implement the functions/processing of the present invention also implement the present invention. That is, the computer programs themselves, which implement the functions/processing of the present invention, are also incorporated in the present invention.

In this case, each program may take any form, e.g., an object code, a program executed by an interpreter, and script data supplied to an OS, as long as it has the function of the program.

As a recording medium for supplying the programs, a floppy (registered trademark) disk, hard disk, optical disk, magnetooptical disk, MO, CD-ROM, CD-R, CD-RW, magnetic tape, nonvolatile memory card, ROM, DVD (DVD-ROM or DVD-R), or the like can be used.

In addition, methods of supplying the programs include the following. A client computer connects to a homepage on the Internet by using a browser to download each computer program of the present invention itself from the homepage or download a compressed file containing an automatic install function into a recording medium such as a hard disk. In this case, the programs can be supplied by dividing the program codes constituting each program of the present invention into a plurality of files, and downloading the respective files from different homepages. That is, the present invention also incorporates a WWW server which allows a plurality of user to download program files for causing the computer to execute the functions/processing of the present invention.

In addition, the functions/processing of the present invention can be implemented by encrypting the programs of the present invention, storing the encrypted data in storage media such as CD-ROMs, distributing them to users, allowing users who satisfy a predetermined condition to download key information for decryption from a homepage through the Internet, executing the encrypted programs using the key information, and allowing a computer to install the programs.

The functions of the above embodiments are implemented when the readout programs are executed by the computer. In addition, the functions of the embodiments may be implemented in cooperation with the OS running on the computer performs on the basis of the instructions of the programs. In this case, the OS or the like executes part or all of actual processing. This processing then implements the functions of the above embodiments.

Furthermore, part or all of the functions of the above embodiments may be implemented by writing the programs read out from the storage medium in the memory of a function expansion board inserted into the computer or a function expansion unit connected to the computer. In this case, the CPU of the function expansion board or function expansion unit executes part or all of actual processing on the basis of the instructions of the programs after the programs are written in the function expansion board or function expansion unit.

The present invention can make each network-connected device process a cooperation flow within a desired time limit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-326593, filed Nov. 10, 2005, which is hereby incorporated by reference herein in its entirety.

What is claimed is:

1. A task cooperation processing method comprising:
a step of using an information processing apparatus to perform the steps:
an acquisition step of acquiring a processing flow which defines cooperation processing performed by a plurality of tasks;
a setting step of setting input information associated with an amount of data to be processed by the acquired cooperation flow;
a calculation step of calculating an estimation time required for processing of the acquired processing flow on the basis of the input information;
a designation step of accepting a time limit, designated by a user, for executing the processing flow; and
a change step of, when the estimation time is longer than the time limit, changing function settings of tasks in the processing flow so as to make the estimation time calculated in the calculation step become not more than the time limit,
wherein, in the change step, function items which are set in tasks included in a group consisting of resolution, print method and color mode, contained in the processing flow and whose settings should be changed, are sequentially selected from change information which describes function items to be changed and changed contents, and setting contents of the function items are changed by referring to the change information until the estimation time becomes not more than the time limit.

2. The method according to claim 1, wherein, in the change step, a user interface is provided which presents function items set in tasks contained in the processing flow and setting contents of the function items, and which receives an instruction to change setting contents of a function item designated in accordance with user operation.

3. The method according to claim 1, wherein the change information is registered in correspondence with the processing flow acquired in the acquisition step, and is acquired together with the processing flow.

4. The method according to claim 1, wherein
the change step comprises an allocation step of allocating a processing time to each of said plurality of tasks such that processing of the processing flow is complete within the time limit, and
setting contents of function items are changed such that processing of each task is complete within an allocated processing time.

5. The method according to claim 4, wherein in the assignment step, a processing time required for each task in a state defined by the processing flow is adjusted such that a total of the processing times becomes not more than the time limit, and an adjustment amount is changed in accordance with a priority assigned to each task.

6. A computer readable medium encoded with computer instructions which when executed causes a computer to perform a method, the method comprising the steps defined in claim 1.

7. An information processing apparatus which processes a processing flow in which cooperation processing by a plurality of tasks is defined, comprising:
an acquisition unit adapted to acquire a processing flow which defines cooperation processing performed by a plurality of tasks;
a setting unit adapted to set input information associated with an amount of data to be processed by the acquired cooperation flow;
a calculation unit adapted to calculate an estimation time required for processing of the acquired processing flow on the basis of the input information;
a designation unit adapted to accept a time limit, designated by a user, for executing the processing flow; and
a change unit adapted to, when the estimation time is longer than the time limit, changing function settings of tasks in the processing flow so as to make the estimation time calculated in the calculation step become not more than the time limit,
wherein, in the change step unit sequentially selects function items which are set in tasks included in a group consisting of resolution, print method and color mode, contained in the processing flow and whose settings should be changed, are sequentially selected from change information which describes function items to be changed and changed contents, and setting contents of the function items are changed by referring to the change information until the estimation time becomes not more than the time limit.

8. The apparatus according to claim 7, wherein said change unit provides a user interface which presents function items set in tasks contained in the processing flow and setting contents of the function items, and receives an instruction to change setting contents of a function item designated in accordance with user operation.

9. The apparatus according to claim 7, wherein the change information is registered in correspondence with the processing flow acquired by said acquisition unit, and is acquired together with the processing flow.

10. The apparatus according to claim 7, wherein
said change unit comprises an allocation unit adapted to allocate a processing time to each of said plurality of tasks such that processing of the processing flow is complete within the time limit, and
setting contents of function items are changed such that processing of each task is complete within an allocated processing time.

11. The apparatus according to claim 10, wherein said assignment unit adjusts a processing time required for each task in a state defined by the processing flow such that a total of the processing times becomes not more than the time limit, and an adjustment amount is changed in accordance with a priority assigned to each task.

12. The apparatus according to claim 7, wherein a task defined in the processing flow can be executed by the information processing apparatus or an external apparatus communicatively connected to the information processing apparatus.

13. A system in which a plurality of information processing apparatuses including a first information processing apparatus and a second information processing apparatus are communicatively connected to each other, wherein said first information processing information processing apparatus comprises a holding unit adapted to hold a plurality of types of processing flows in which cooperation processing by a plurality of tasks is defined, and said second information processing apparatus comprises:

an acquisition unit adapted to acquire a processing flow which defines cooperation processing performed by a plurality of tasks;

a setting unit adapted to set input information associated with an amount of data to be processed by the acquired cooperation flow;

a calculation unit adapted to calculate an estimation time required for processing of the acquired processing flow on the basis of the input information;

a designation unit adapted to accept a time limit, designated by a user, for executing the processing flow; and a change unit adapted to, when the estimation time is longer than the time limit, changing function settings of tasks in the processing flow so as to make the estimation time calculated in the calculation step become not more than the time limit, wherein, in the change step, function items which are set in tasks included in a group consisting of resolution, print method and color mode, contained in the processing flow and whose settings should be changed, are sequentially selected from change information which describes function items to be changed and changed contents, and setting contents of the function items are changed by referring to the change information until the estimation time becomes not more than the time limit.

* * * * *